(12) United States Patent
Kanno

(10) Patent No.: US 10,628,303 B2
(45) Date of Patent: *Apr. 21, 2020

(54) STORAGE DEVICE THAT MAINTAINS A PLURALITY OF LAYERS OF ADDRESS MAPPING

(71) Applicant: Toshiba Memory Corporation, Tokyo (JP)

(72) Inventor: Shinichi Kanno, Ota Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,428

(22) Filed: Apr. 8, 2019

(65) Prior Publication Data

US 2019/0236003 A1 Aug. 1, 2019

Related U.S. Application Data

(63) Continuation of application No. 15/438,687, filed on Feb. 21, 2017, now Pat. No. 10,255,178.

(30) Foreign Application Priority Data

Sep. 6, 2016 (JP) .................................. 2016-173680

(51) Int. Cl.
*G06F 12/02* (2006.01)

(52) U.S. Cl.
CPC ...... *G06F 12/0246* (2013.01); *G06F 12/0292* (2013.01); *G06F 2212/1024* (2013.01);
(Continued)

(58) Field of Classification Search
CPC .............. G06F 3/00; G06F 3/06–0689; G06F 5/00–16; G06F 7/00–785;
(Continued)

(56) References Cited

U.S. PATENT DOCUMENTS

| 5,295,258 | A | 3/1994 | Jewett et al. |
| 5,586,283 | A | 12/1996 | Lopez-Aguado et al. |

(Continued)

FOREIGN PATENT DOCUMENTS

JP 2012141944 A 7/2012

OTHER PUBLICATIONS

Shared address translation revisited; Dong et al.; roceedings of the Eleventh European Conference on Computer Systems, Article No. 18; Apr. 18-21, 2016 (Year: 2016).*

(Continued)

*Primary Examiner* — Daniel C. Chappell
(74) *Attorney, Agent, or Firm* — Kim & Stewart LLP

(57) ABSTRACT

A storage device includes a nonvolatile memory, a cache memory, and a processor configured to load, from the nonvolatile memory into the cache memory, a fragment of each layer of an address mapping corresponding to a target logical address, and access the nonvolatile memory at a physical address mapped from the target logical address, by referring to the fragments of the layers of the address mapping loaded into the cache memory. The layers are arranged in a hierarchy and each layer of the address mapping except for the lowermost layer indicates correspondence between each of segmented logical address ranges mapped in the layer and a physical location of an immediately-lower layer in which said each segmented logical address range is further mapped in a narrower range. The lowermost layer indicates correspondence between each logical address mapped therein and a physical location of the nonvolatile memory associated therewith.

9 Claims, 10 Drawing Sheets

(52) U.S. Cl.
CPC .......... *G06F 2212/214* (2013.01); *G06F 2212/7201* (2013.01); *G06F 2212/7202* (2013.01); *G06F 2212/7207* (2013.01)

(58) Field of Classification Search
CPC ..... G06F 9/00–548; G06F 11/00–3696; G06F 12/00–0246; G06F 12/0253–0292; G06F 12/04–16; G06F 13/00–4295; G06F 17/00; G06F 17/30–40; G06F 21/60–88; G06F 2003/0691–0698; G06F 2201/00–885; G06F 2205/00–126; G06F 2206/00–20; G06F 2207/00–7295; G06F 2209/00–549; G06F 2211/00–902; G06F 2212/00–7211; G06F 2213/00–4004; G06F 2216/00–17; G06F 2221/00–2153; G11C 16/00–3495
See application file for complete search history.

(56) References Cited

U.S. PATENT DOCUMENTS

| | | | |
|---|---|---|---|
| 6,295,560 B1 | 9/2001 | Kanno et al. | |
| 6,581,132 B1 | 6/2003 | Kakinuma et al. | |
| 6,591,329 B1 | 7/2003 | Kakinuma et al. | |
| 7,877,540 B2 * | 1/2011 | Sinclair | G06F 3/0605 711/103 |
| 7,904,640 B2 | 3/2011 | Yano et al. | |
| 7,953,920 B2 | 5/2011 | Yano et al. | |
| 8,060,797 B2 | 11/2011 | Hida et al. | |
| 8,341,331 B2 | 12/2012 | Meir | |
| 8,543,757 B2 * | 9/2013 | Gorobets | G06F 12/0246 711/103 |
| 8,631,222 B2 | 1/2014 | Craddock et al. | |
| 8,982,660 B2 | 3/2015 | Huang et al. | |
| 9,251,089 B2 | 2/2016 | Gschwind | |
| 9,329,994 B2 | 5/2016 | Aochi et al. | |
| 9,384,123 B2 | 7/2016 | Hida et al. | |
| 9,396,103 B2 | 7/2016 | Sinclair et al. | |
| 9,996,474 B2 | 6/2018 | Ter-Grigoryan et al. | |
| 10,255,178 B2 * | 4/2019 | Kanno | G06F 12/0246 |
| 2003/0041222 A1 | 2/2003 | Akey et al. | |
| 2005/0141312 A1 | 6/2005 | Sinclair et al. | |
| 2007/0255870 A1 | 11/2007 | Chikusa et al. | |
| 2008/0034174 A1 | 2/2008 | Traister et al. | |
| 2009/0089488 A1 | 4/2009 | Yasui | |
| 2009/0144519 A1 | 6/2009 | Codrescu et al. | |
| 2009/0222628 A1 | 9/2009 | Yano et al. | |
| 2010/0161885 A1 | 6/2010 | Kanno et al. | |
| 2010/0281204 A1 | 11/2010 | Yano et al. | |
| 2011/0238899 A1 | 9/2011 | Yano et al. | |
| 2012/0233382 A1 | 9/2012 | Yamanaka et al. | |
| 2014/0122781 A1 | 5/2014 | Smith et al. | |
| 2016/0371196 A1 | 12/2016 | Koh | |

OTHER PUBLICATIONS

Heterogeneously tagged caches for low-power embedded systems with virtual memory support; Zhou et al.; ACM Transactions on Design Automation of Electronic Systems, vol. 13, iss. 2, Article No. 32; Apr. 2008 (Year: 2008).*

The Dynamic Block Remapping Cache; Pedroni et al.; 22nd International Symposium on Computer Architecture and High Performance Computing; Oct. 27-30, 2010 (Year: 2010).

Virtual-address caches. Part 1: problems and solutions in uniprocessors; Cekleov et al.; IEEE Micro, vol. 17, iss. 5, pp. 64-71; Sep. 1997 (Year: 1997).

Near-Memory Address Translation; Picorel et al.; 26th International Conference on Parallel Architectures and Compilation Techniques; Sep. 9-13, 2017 (Year: 2017).

* cited by examiner

STORAGE DEVICE THAT MAINTAINS A PLURALITY OF LAYERS OF ADDRESS MAPPING

CROSS-REFERENCE TO RELATED APPLICATION

This application is a continuation of U.S. patent application Ser. No. 15/438,687, filed Feb. 21, 2017, which is based upon and claims the benefit of priority from Japanese Patent Application No. 2016-173680, filed Sep. 6, 2016, the entire contents of which are incorporated herein by reference.

FIELD

Embodiments described herein relate generally to a storage device and an information processing system including the same.

BACKGROUND

A solid state drive (SSD), for example, includes a nonvolatile memory such as a NAND-type flash memory. The NAND-type flash memory includes a plurality of blocks (physical blocks). Each of the blocks includes a plurality of memory cells arranged at intersections between word lines and bit lines.

DETAILED DESCRIPTION

Figure 1:
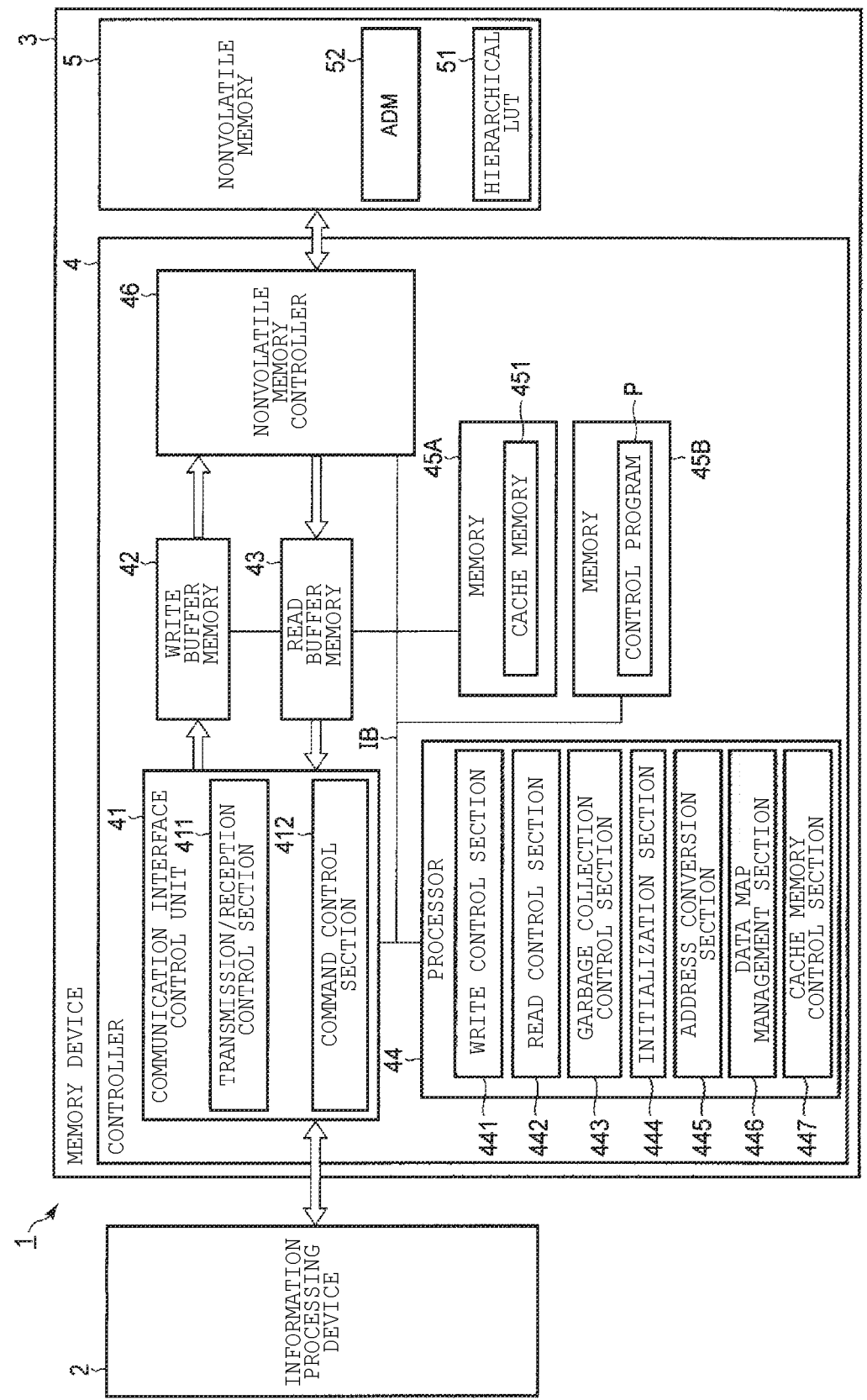
FIG. 1 is a block diagram of an information processing system according to an embodiment.

An embodiment provides a storage device that efficiently carries out address conversion.

In general, according to an embodiment, a storage device includes a nonvolatile memory, a cache memory, and a processor. The processor is configured to load, from the nonvolatile memory into the cache memory, a fragment of each of a plurality of layers of an address mapping corresponding to a target logical address to be accessed, and access the nonvolatile memory at a physical address mapped from the target logical address, by referring to the fragments of the layers of the address mapping loaded into the cache memory. The layers are arranged in a hierarchy and each layer of the address mapping except for the lowermost layer indicates correspondence between each of segmented logical address ranges mapped in the layer and a physical location of an immediately-lower layer in which said each segmented logical address range is further mapped in a narrower range. The lowermost layer indicates correspondence between each logical address mapped therein and a physical location of the nonvolatile memory associated therewith.

Hereinafter, embodiments will be described with reference to the drawings. In the embodiments, the same signs are used for substantially same functions and components, and the description thereof will be given only when needed.

According to an embodiment, a memory (storage) device includes a hierarchical look-up table (hereinafter, referred to as LUT). The LUT is a kind of address conversion data used for conversion between a logical address and a physical address.

In the present embodiment, the memory (storage) device, for example, is an SSD; however, the memory device may be various memory devices including a memory card, a hard disk drive (HDD), a hybrid type memory device including the HDD and the SSD, an optical disk, a storage device, a memory server and the like. When the memory device is the SSD, the memory device has the same communication interface as that of the HDD.

The SSD memory device includes a nonvolatile memory. In the present embodiment, it is assumed that the nonvolatile memory is a NAND-type flash memory. However, the nonvolatile memory, for example, may include other types of memories such as a NOR-type flash memory, an MRAM (Magnetoresistive Random Access Memory), a PRAM (Phase change Random Access Memory), a ReRAM (Resistive Random Access Memory), and a FeRAM (Ferroelectric Random Access Memory) which are not the NAND-type flash memory. The nonvolatile memory may include a flash memory with a three-dimensional structure.

In the nonvolatile memory, data are collectively erased for each erase unit area. The erase unit area includes a plurality of write unit areas and a plurality of read unit areas. When the nonvolatile memory is the NAND-type flash memory, the erase unit area corresponds to a block. The write unit area and the read unit area correspond to a page.

In the present embodiment, access represents both writing or storing data in a memory and reading data from the memory.

In the present embodiment, a program is assumed to be a computer program. In the computer program, processes to be performed by a computer are described in an order. The program is executed by the computer, so that it is possible to perform various functions such as issuing and reception, of commands, data, and information, data processing, and operations.

In the present embodiment, the computer, for example, is a machine that performs operations and processing in accordance with commands. For example, the computer includes a memory and a processor. The memory stores programs. The processor is hardware for performing a command set (for example, transmission, calculation, processing, control, and management of data) described in the program stored in the memory. In the present embodiment, the computer should be regarded in a broad sense and, for example, includes an information processing device, a controller of a memory device, a personal computer, a large computer, a microcomputer, a server device and the like. In the present embodiment, instead of the computer, a computer system, in which a plurality of computers operates in cooperation with one another, may be used.

In the present embodiment, a software interface, for example, is a protocol and a procedure defined when one program uses the other program. More specifically, the software interface, for example, is a protocol defining a procedure, a data format and the like for calling functions of a certain program, data and the like to be managed from the other program, and using the called functions, the data and the like to be managed. An example of the software interface is an API (Application Programming Interface).

In the present embodiment, identification information is written as ID.

FIG. 1 is a block diagram of an information processing system according to the present embodiment.

An information processing system 1 includes an information processing device 2 and a memory device 3. The information processing device 2 can operate as a host device of the memory device 3.

The memory device 3 may be built in the information processing device 2, and the information processing device 2 and the memory device 3 may be connected to each other such that they can transmit/receive data by a network and the like. The memory device 3 may be communicably connected to a plurality of information processing devices 2. Furthermore, a plurality of memory devices 3 may be communicably connected to one or more information processing devices 2.

The memory device 3 includes a controller 4 as an example of a control circuit, and a nonvolatile memory 5. The controller 4 and the nonvolatile memory 5 can be detachable from each other, and a memory capacity of the memory device 3 may be freely expanded. Here, the memory capacity is a maximum amount of data that can be written in the memory.

The controller 4 includes a communication interface control unit 41, a write buffer memory 42, a read buffer memory 43, a processor 44, memories 45A and 45B, and a nonvolatile memory controller 46. These elements are electrically connected to one another by an internal bus IB. Furthermore, the controller 4 is electrically connected to the nonvolatile memory 5.

The communication interface control unit 41, for example, includes a transmission/reception control section 411 and a command control section 412. The communication interface control unit 41 performs communication in accordance with a communication interface between an external device and the memory device 3.

The transmission/reception control section 411, for example, controls reception of data, information, signals, commands, requests, messages, designation and the like from the external device such as the information processing device 2, and controls transmission of data, information, signals, commands, requests, messages, instructions and the like to the external device.

The transmission/reception control section 411, for example, transmits/receives data to/from the information processing device 2. The transmission/reception control section 411 stores data received from the information processing device 2 in the write buffer memory 42. The transmission/reception control section 411 reads data, which has been read from the nonvolatile memory 5, from the read buffer memory 43, and transmits the data to the information processing device 2.

More specifically, the transmission/reception control section 411 transmits/receives data to/from the information processing device 2. The transmission/reception control section 411 stores data received from the information processing device 2 in the write buffer memory 42. The transmission/reception control section 411 reads data, which has been read from the nonvolatile memory 5, from the read buffer memory 43, and transmits the data to the information processing device 2.

The command control section 412, for example, controls reception of commands, messages, requests, instructions and the like from the external device, and controls transmission of commands, messages, requests, instructions and the like to the external device.

More specifically, the command control section 412 transmits/receives commands to/from the information processing device 2. When a command received from the information processing device 2 is a write command, the command control section 412 sends the write command to a write control section 441. When a command received from the information processing device 2 is a read command, the command control section 412 sends the read command to a read control section 442.

Even when a command transmitted/received between the information processing device 2 and the command control section 412 and a command transmitted/received in the memory device 3 have the same name, command formats may be different from each other.

In addition, the whole or a part of the functions of the communication interface control unit 41 may be performed by the processor 44, and may be performed by a processor different from the processor 44.

The write buffer memory 42 temporarily stores write data transmitted from the information processing device 2. Specifically, the write buffer memory 42 temporarily stores the write data until an amount of the write data reaches a predetermined data size suitable for the nonvolatile memory 5.

The read buffer memory 43 temporarily stores read data read from the nonvolatile memory 5. Specifically, in the read buffer memory 43, the read data are rearranged in an order (an order of logical addresses designated by the information processing device 2) suitable for the information processing device 2.

The processor 44 controls the entire operation of the controller 4 via an internal bus IB.

The processor 44, for example, temporarily stores a control program P, which has been stored in the memory 45B, in the memory 45A, and executes the control program P stored in the memory 45A. In this way, for example, the processor 44 performs functions as the write control section 441, the read control section 442, a garbage collection control section 443, an initialization section 444, and an address conversion section 445. The write control section 441, the read control section 442, the garbage collection control section 443, the initialization section 444, and the address conversion section 445 may be freely combined with one another or separated from one another. For example, the initialization section 444 and the address conversion section 445 may be combined with each other. The write control section 441, the read control section 442, the garbage collection control section 443, the initialization section 444, and the address conversion section 445 may be implemented by hardware.

The processor 44, for example, may be a CPU (Central Processing Unit), an MPU (Micro-Processing Unit), a DSP (Digital Signal Processor) and the like.

The write control section 441, for example, performs control for sending data and the like from the communication interface control unit 41 to the nonvolatile memory controller 46 via the write buffer memory 42.

More specifically, the write control section 441 converts a logical address into a physical address by using the address conversion section 445 in accordance with a write command from the command control section 412, and sends the write command, write data, and the physical address to the nonvolatile memory controller 46.

The read control section 442, for example, performs control for sending data and the like from the nonvolatile memory controller 46 to the communication interface control unit 41 via the read buffer memory 43.

More specifically, the read control section 442 converts a logical address into a physical address by using the address conversion section 445 in accordance with a read command from the command control section 412, sends the read command and the physical address to the nonvolatile memory controller 46, receives read data corresponding to the physical address from the nonvolatile memory controller 46, and transmits the read data to the information processing device 2 via the read buffer memory 43 and the communication interface control unit 41.

The garbage collection control section 443 performs garbage collection of the nonvolatile memory 5. For example, the garbage collection control section 443 may perform the garbage collection of the nonvolatile memory 5 by cooperating with the write control section 441, the read control section 442, and the nonvolatile memory controller 46. In the present embodiment, the garbage collection is a process of releasing an unnecessary area of a memory. When the nonvolatile memory 5 is a NAND-type flash memory, it is necessary to erase data in a block in order to reuse the block. To reuse the block, valid data stored in a block to be subjected to the garbage collection have to be moved to another block. Consequently, when the nonvolatile memory 5 is the NAND-type flash memory, compaction of valid data can be performed as a result of carrying out the garbage collection.

The memory 45A, for example, includes a main storage device used as a work memory of the processor 44, and follows control by the processor 44. The memory 45A, for example, stores programs, data, information and the like to be processed by the processor 44. In the present embodiment, it is assumed that the memory 45A is a DRAM (Dynamic Random. Access Memory); however, for example, the memory 45A may be another volatile memory or a nonvolatile memory such as an SRAM (Static Random Access Memory).

The initialization section 444 generates a hierarchical LUT 51 in an initial state. For example, based on setting information of the memory device 3 such as the capacity of the nonvolatile memory 5 and the capacity of a namespace, the initialization section 444 decides the number of hierarchical layers in each namespace of the hierarchical LUT 51, data capacities corresponding to each hierarchical layer, and a link relation between hierarchical layers, and decides a data structure of the hierarchical LUT 51 in the initial state. For example, the initialization section 444 writes the hierarchical LUT 51 in the initial state in the nonvolatile memory 5.

The initialization section 444 generates an active data map 52 (hereinafter, referred to as an ADM) in an initial state. The ADM is data for managing whether data stored in the nonvolatile memory 5 are valid or invalid. For example, in the ADM 52, for each minimum unit of data written in the nonvolatile memory 5, "1" is set when data of the minimum unit are valid, and "0" is set when data of the minimum unit are invalid. The ADM 52 in the initial state is written in the nonvolatile memory 5. Details of the ADM 52 will be described below.

A cache memory control section 447, for example, reads a part of the hierarchical LUT 51 or a part of the ADM 52 from the nonvolatile memory 5 by using the read control section, 442 and stores the read part of the hierarchical LUT 51 or the read part of the ADM 52 in a cache memory 451. The cache memory control section 447, for example, performs control of writing the part of the hierarchical LUT 51 or the part of the ADM 52 stored in the cache memory 451 back to the hierarchical LUT 51 or the ADM 52 of the nonvolatile memory 5.

In addition, the processes of the cache memory control section 447 may be performed through cooperation of the address conversion section 445 and a data map management section 446. In this case, the cache memory control section 447 may be omitted.

Moreover, the cache memory control section 447 controls whether cache lines stored in the cache memory 451 belong to a free list, a clean list, or a dirty list. In the present embodiment, the cache lines, for example, are data of a unit size which are stored in the cache memory 451. The free list, the clean list, and the dirty list will be described below in detail.

The address conversion section 445 hierarchically describes mapping from a logical address to a physical address with respect to the hierarchical LUT 51 each time data are written. The address conversion section 445 converts a logical address into a physical address by referring to the hierarchical LUT 51. More specifically, the address conversion section 445 searches for partial data, which are a part of the hierarchical LUT 51 to be stored in the cache memory 451, in accordance with a hierarchical structure of the hierarchical LUT 51, stores the partial data in the cache memory 451, and refers to the cache memory 451, thereby converting the logical address into the physical address. Details of the hierarchical LUT 51 will be described below.

The data map management section 446 updates the ADM 52 each time data are written. More specifically, the data map management section 446 performs writing and reading for a part of the ADM 52 stored in the cache memory 451. Then, the part of the ADM 52 stored in the cache memory 451 is written back to the nonvolatile memory 5.

The memory 45B, for example, includes a nonvolatile memory device that stores a program and data used by the controller 4 such as the control program P.

The nonvolatile memory controller 46 controls writing of data and the like in the nonvolatile memory 5, and reading of data from the nonvolatile memory 5.

It is desirable that the nonvolatile memory controller 46 include a DMAC (Direct Memory Access Controller), an error correction section, a randomizer (or a scrambler) and the like. However, the nonvolatile memory controller 46 may not include these functional sections.

The DMAC transmits write data, read data, and the like via the internal bus IB. A plurality of DMACs may be set in various positions of the controller 4 as needed.

The error correction section adds an error correcting code (ECC) to write data transmitted from the write buffer memory 42. The error correction section corrects read data, which have been read from the nonvolatile memory 5, by using the ECC.

When data are written in the nonvolatile memory 5, the randomizer distributes the write data such that the write data are not biased to a specific page of the nonvolatile memory 5 or in a word line direction (called a randomization process). In this way, it is possible to equalize the number of writing times and extend the lifetime of memory cells of the nonvolatile memory 5. As a result, it is possible to improve the reliability of the nonvolatile memory 5. Furthermore, in a data reading operation, the randomizer performs a reverse process of the randomization process at the time of writing and reconstructs the original data.

The cache memory 451 included in the memory 45A stores cache data of the hierarchical LUT 51 and the ADM 52 stored in the nonvolatile memory 5. More specifically, the cache memory 451 can perform reading and writing at a speed faster than that of the nonvolatile memory 5, and stores partial data, which are a part of the hierarchical LUT 51 and map partial data which are apart of the ADM 52. In the present embodiment, the hierarchical LUT 51 and the ADM 52 have been written in the nonvolatile memory 5. However, at least one of the hierarchical LUT 51 and the ADM 52, for example, may be stored in another nonvolatile memory such as the memory 45B provided in the memory device 3. Furthermore, the nonvolatile memory 5 may be divided into a memory (or a memory area) for storing user data, a memory (or a memory area) for storing stores the hierarchical LUT 51, and a memory (or a memory area) for storing the ADM 52.

When the hierarchical LUT 51 has been stored in the nonvolatile memory 5, the cache memory control section 447 reads a part (partial data) or the whole of the hierarchical LUT 51 to the cache memory 451 from the nonvolatile memory 5. The cache memory control section 447 reflects the rewritten content of the cache memory 451 in the hierarchical LUT 51 of the nonvolatile memory 5 at any timing.

Similarly, when the ADM 52 has been stored in the nonvolatile memory 5, the cache memory control section 447 reads a part (map part data) or the whole of the ADM 52 to the cache memory 451 from the nonvolatile memory 5. The cache memory control section 447 reflects the rewritten content of the cache memory 451 to the ADM 52 of the nonvolatile memory 5 at any timing.

When the nonvolatile memory is a NAND-type flash memory, the LUT is data in which a logical address (hereinafter, referred to as a Logical Block Addressing (LBA)) and a physical address (hereinafter, referred to as Physical Block Addressing (PBA)) of write data or read data have been related to each other.

The hierarchical LUT 51 is data in which the LUT has been hierarchically configured. More specifically, in the hierarchical LUT 51, an LBA designated as a write destination or a read destination and a PBA indicating the position of the nonvolatile memory 5 are associated with each other by a hierarchical structure including a plurality of layers. The processor 44 can efficiently search for a PBA corresponding to an LBA or an LBA corresponding to a PBA by using the hierarchical LUT 51.

The hierarchical LUT 51 may have a data structure in a table format, and for example, may have another data structure such as a list format. The hierarchical LUT 51 includes a plurality of pieces of partial data (for example, tables). Hereinafter, the partial data are referred to as a fragment. The fragment is fragmented data. A plurality of fragments, for example, has a predetermined size, that is, the same size. The plurality of fragments belongs to each of a plurality of layers. A first fragment belonging to a first layer of the plurality of layers includes a logical address, and a plurality of types of reference destination information (hereinafter, referred to as pointers) for referring to a plurality of second fragments belonging to a second layer which is immediately lower than the first layer. The lowermost fragment in the hierarchical structure includes a logical address and a physical address. Each of a plurality of uppermost fragments belonging to the uppermost layer corresponds to each of a plurality of namespaces. In the hierarchical LUT 51, the number of hierarchical layers of the plurality of namespaces differs according to storage capacities of the plurality of namespaces. For example, the number of hierarchical layers of a namespace having a small storage capacity is small and the number of hierarchical layers of a namespace having a large storage capacity is large. A predetermined size of each of the plurality of fragments, for example, corresponds to a unit size of a cache line included in a cache memory. Details of the hierarchical LUT 51 will be described below.

In the present embodiment, the configuration of the controller 4 illustrated in FIG. 1 is illustrative and the controller 4 is not limited to the configuration in FIG. 1.

The cache memory 451 is a cache memory that increases the speed of access to the hierarchical LUT 51 and the ADM 52, and stores a part of the hierarchical LUT 51 and the ADM 52. The cache memory 451 may be rewritten by the write control section 441 via the write buffer memory 42, or may be read by the read control section 442 via the read buffer memory 43.

Figure 2:
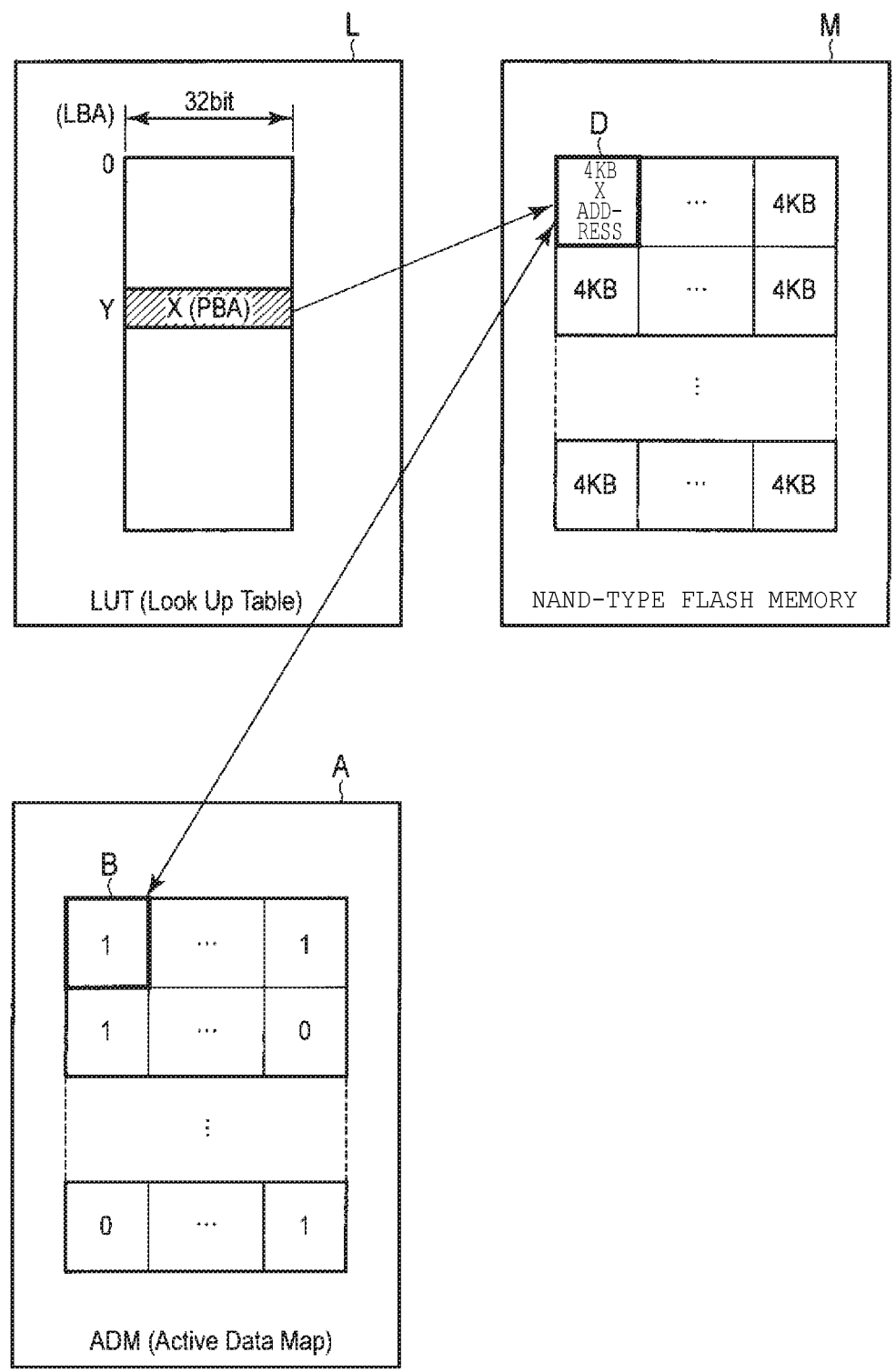
FIG. 2 conceptually illustrates a look-up table and an active data map.
Figure 3:
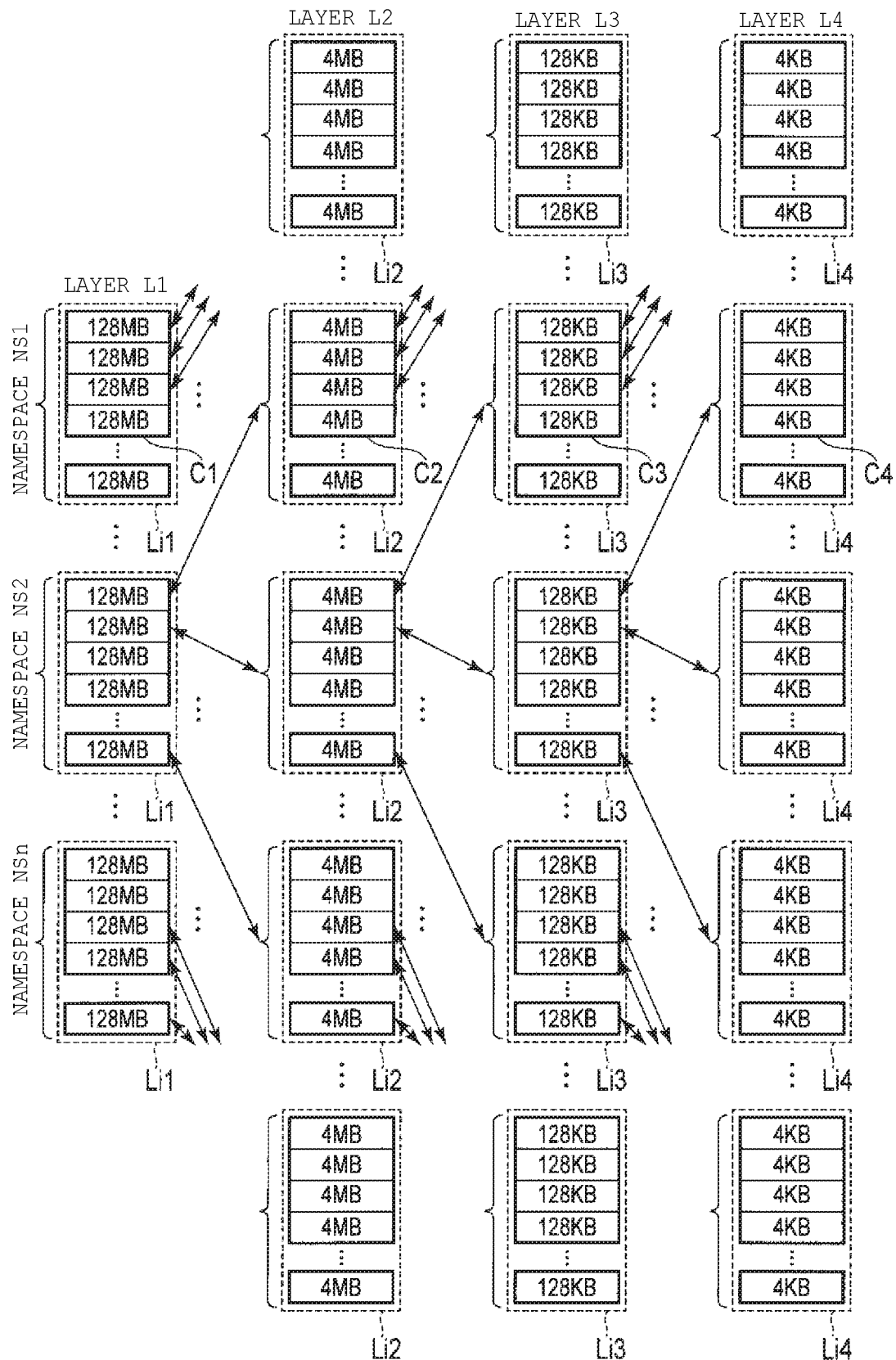
FIG. 3 conceptually illustrates a configuration of a hierarchical look-up table according to the embodiment.
Figure 8:
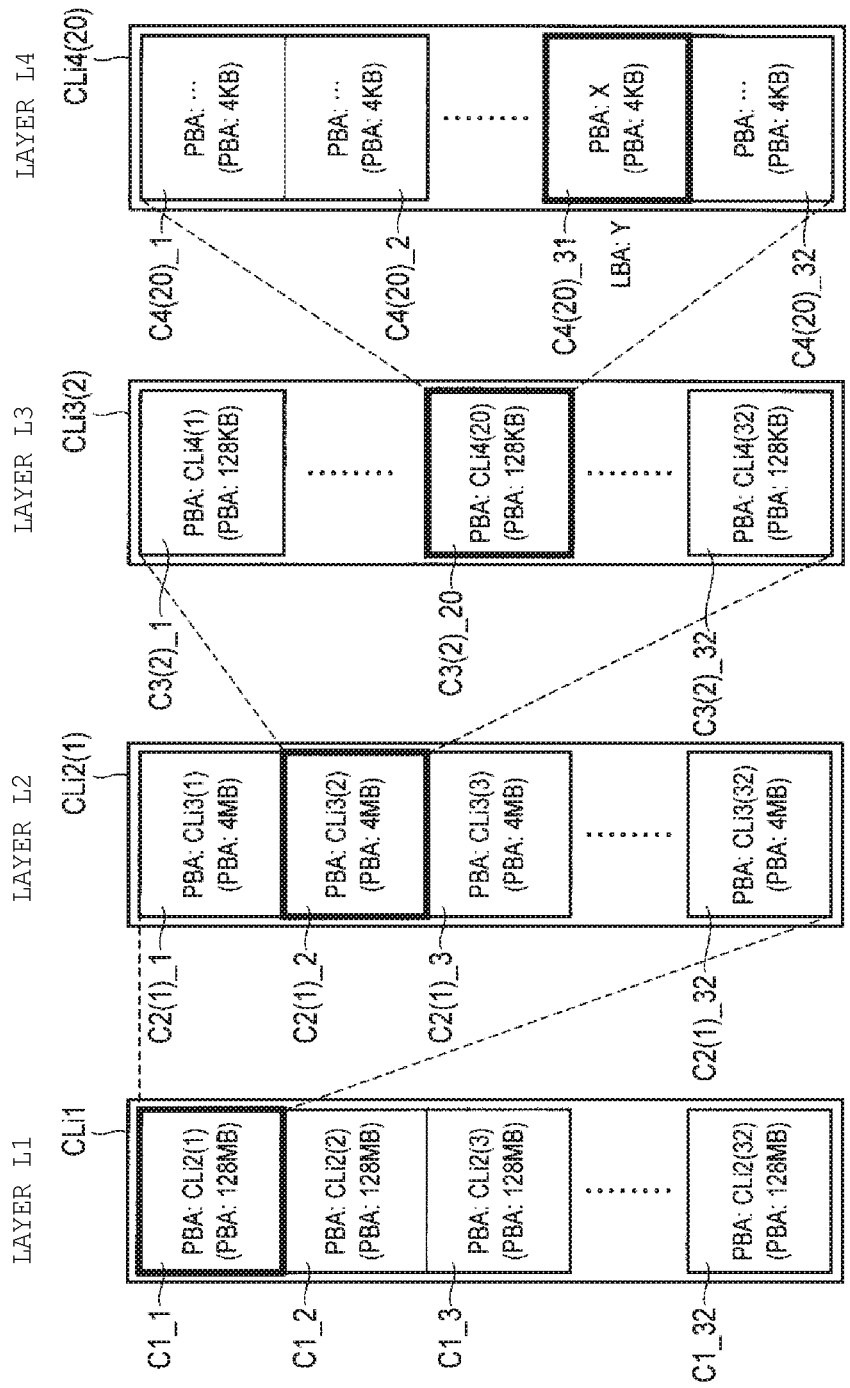
FIG. 8 schematically illustrates a relation of cache lines in the physical address search process according to the embodiment.

FIG. 2 conceptually illustrates a typical LUT and a typical ADM. In FIG. 2, and FIGS. 3 and 8 to be described below, a kilobyte is shown as KB.

In an LUT L in FIG. 2, an LBA and a PBA of data of a NAND-type flash memory M are related to each other. In the LUT L, an LBA Y corresponds to a PBA X. In an area of the NAND-type flash memory M indicated by the PBA X, 4 KB data D are written. The amount of data, which can be written in the PBA, can be arbitrarily changed.

For example, when the size of a PBA stored in each LBA of the LUT L is assumed to 32 bits (4 byte), the LUT L needs the amount of 4 byte data in order to store the PBA X corresponding to the 4 KB data D. That is, an LUT with a size corresponding to 1/1000 of the size of the NAND-type flash memory M is required.

In the LUT L, caching on a DRAM from the NAND-type flash memory M is required at the time of start of use (at a current-carrying time) of the NAND-type flash memory M. Therefore, when the size of the LUT L is large in proportional to the capacity of the NAND-type flash memory M, a time required for the caching also increases. For example, in a memory device having a NAND-type flash memory M of about 1 TB, the size of the LUT L is about 1 gigabyte (GB), and about several tens of seconds are required until the LUT L is read on a DRAM when the memory device 3 is powered on.

In the present embodiment, the LUT is hierarchized and the size of the LUT to be read on a DRAM at a time is reduced. In this way, a time required for reading the LUT is shortened. Furthermore, the LUT is efficiently searched, resulting in an increase in an access speed.

An ADM A is data for managing whether data stored in the NAND-type flash memory M is valid or invalid. In FIG. 2, the ADM A indicates whether each 4 KB data stored in the NAND-type flash memory M are valid or invalid by using 1-bit flag information. For example, since data D stored in the NAND-type flash memory M corresponds to flag information B of the ADM A and the flag information B is "1" indicating validity, the data D are valid data.

FIG. 3 conceptually illustrates a configuration of the hierarchical LUT 51 according to the present embodiment. In FIGS. 3 and 8, a megabyte is shown as MB.

A namespace is a memory space obtained by dividing a plurality of blocks included in the nonvolatile memory 5. A namespace is assigned to each memory area of a certain range, so that it is possible to access appropriate data of an appropriate memory area by using a namespace ID and logical addresses even when the logical addresses overlap with each other in at least two memory areas. The namespaces can be allowed to be distinguished from each other, so that LBAs can be independently assigned for each namespace, and appropriate access is possible even when LBAs overlap with each other in a plurality of namespaces. Consequently, in the information processing system 1, access to different namespaces, for example, is treated similarly as access to different devices.

In the present embodiment, in the hierarchical LUT 51, for example, the LUT is described with the hierarchical structure having a plurality of layers. In the present embodiment, the hierarchical LUT 51 is divided into namespaces NS1 to NSn (n is a natural number equal to or more than 2). The depths of layers of each of the namespaces NS1 to NSn in the hierarchical LUT 51 are decided according to the sizes of the namespaces NS1 to NSn.

In a first (the uppermost) layer L1 of the hierarchical LUT 51, a range of the PBAs of the nonvolatile memory 5 is assigned to n fragments (an element group) Li1 corresponding to the namespaces NS1 to NSn according to the sizes of the namespaces NS1 to NSn. Each of the n fragments Li1 of the first layer L1 further includes a plurality of elements C1.

In a second layer L2, each of the ranges of the PBAs divided into n in the first layer L1 is further divided into m fragments Li2. The number m, for example, may be the number of the plurality of elements C1 included in the fragments Lit of the first layer L1. Each of the fragments Li2 of the second layer L2 further includes a plurality of elements C2. Each of the plurality of elements C1 included in the fragments Lit of the first layer L1 correlates with the fragments Li2 of the second layer L2, and, for example, includes a pointer indicating a position of a corresponding lower fragment Li2.

In a third layer L3, each of the ranges of the PBAs divided into m in the second layer L2 is further divided into one fragment Li3. The number 1, for example, may be the number of the plurality of elements C2 included in the fragments Li2 of the second layer L2. Each of the fragments Li3 of the third layer L3 further includes a plurality of elements C3. Each of the plurality of elements C2 included in the fragments Li2 of the second layer L2 correlates with the fragments Li3 of the third layer L3, and, for example, includes a pointer indicating a position of a corresponding lower fragment Li3.

In a fourth layer L4, each of the ranges of the PBAs divided into one in the third layer L3 is further divided into k fragments Li4. The number k, for example, may be the number of the plurality of elements C3 included in the fragments Li3 of the third layer L3. Each of the fragments Li4 of the fourth layer L4 further includes a plurality of elements C4. Each of the plurality of elements C3 included in the fragments Li3 of the third layer L3 correlates with the fragments Li4 of the fourth layer L4, and, for example, includes a pointer indicating a position of a corresponding lower fragment Li4.

The hierarchical LUT 51 specifies a PBA corresponding to an LBA by a PBA indicated in the lowermost fourth layer L4.

As described above, the element C1 in the first layer L1 indicates the fragment Li2 in the second layer L2, the element C2 in the second layer L2 indicates the fragment Li3 in the third layer L3, and the element C3 in the third layer L3 indicates the fragment Li4 in the fourth layer L4, so that the hierarchical LUT 51 is formed.

The number of elements included in one fragment belonging to the first to fourth layers L1 to L4 may be the same, and, for example, may be 32.

FIG. 3 illustrates a case in which the number of layers is 4. However, it is sufficient if the number of layers is equal to or more than 2.

The size of the PBA used in the hierarchical LUT 51 may be 32 bits similarly to the aforementioned example in FIG. 2. Furthermore, the size of the PBA used in the hierarchical LUT 51, for example, may be equal to a width of an address bus of the memory device 3.

For example, each of the fragments Li1 to Li4 includes a PBA (a head physical address) corresponding to a fragment of a corresponding lower layer or a PBA of corresponding data to be accessed, a corresponding namespace ID (a namespace name), a corresponding logical address, and a range (grain) of a PBA to be managed.

For example, when a range of PBAs to be managed by the elements C1 to C4 of the fragments Li1 to Li4 accords with a page unit (for example, 4 KB) treated in the NAND-type flash memory, a PBA of data to be accessed is stored in each of the elements C1 to C4. For example, when there is a lower layer, a PBA (for example, a head physical address) corresponding to a fragment of the lower layer is stored in each of the elements C1 to C4. In addition, the PBA corresponding to the fragment of the lower layer may be written as an address of another format.

In the hierarchical LUT 51, a fragment of an upper layer includes a plurality of elements. A range of a PBA to be managed by each element included in the fragment of the upper layer corresponds to a range of a PBA to be managed by a fragment of a lower layer, and the fragment of the lower layer further includes a plurality of elements. For example, in each element included in the fragment of the upper layer, the PBA corresponding to the fragment of the lower layer is stored. In this way, the upper layer and the lower layer are associated with each other.

Moreover, also in the lower layer, for example, in each element included in each fragment of the lower layer, the PBA corresponding to the fragment of the lower layer is further stored in a similar manner.

When a range of a PBA to be managed in one element is 4 KB, a PBA corresponding to data written in the nonvolatile memory 5 is stored in the element.

When data of a plurality of reference destinations have been continuously arranged in the nonvolatile memory 5, each of the fragments Li1 to Li4 included in the hierarchical LUT 51 may include head pointers indicating heads of the data of the plurality of reference destinations and exclude other pointers not indicating the heads of the data of the plurality of reference destinations. In this way, the size of the hierarchical LUT 51 can be reduced and the use amount of the cache memory 451 can be reduced. For example, when a plurality of PBAs to be referred to by a plurality of elements included in the first fragment belonging to the first layer is continuous, a first element included in the first fragment includes a head PBA of the plurality of PBAs. Other elements included in the first fragment and a second fragment belonging to the second layer, which is lower than the first fragment, can be omitted. In this way, it is possible to reduce a data amount required for the first layer and the second layer in the hierarchical LUT 51. For example, when the second fragment belonging to the second layer has been omitted, the write control section 441 or the read control section 442, determines that the first element included in the first fragment belonging to the first layer refers to the plurality of continuous PBAs. In this way, the write control section 441 or the read control section 442, for example, can improve an access speed for continuous data stored in the nonvolatile memory 5 by using burst transfer and the like.

The example in FIG. 3 will be described in more detail. The first layer L1 is divided into the n fragments Li1 corresponding to the n namespaces NS1 to NSn, respectively. One fragment Li1 corresponds to a PBA range of about 4 GB. The one fragment Li1 further includes 32 elements C1. One element C1 corresponds to a PBA range of about 128 MB. That is, a range of the PBA corresponding to the element C1 of the fragment Li1 is 128 MB. A range of the PBA managed by the element C1 is larger than a minimum unit of data treated in the NAND-type flash memory, for example, a page unit (for example, 4 KB). Therefore, the fragments Li2 of the second layer L2 are generated for each element C1, and an address indicating a head of a corresponding fragment Li2 of the second layer L2 is stored in each element C1.

The second layer L2 is divided into the fragments Li2 corresponding to the elements C1 of the first layer L1. One fragment Li2 corresponds to a PBA range of about 128 MB. The one fragment Li2 further includes 32 elements C2. One element C2 corresponds to a PBA range of about 4 MB. That is, a range of the PBA corresponding to the element C2 of the fragment Li2 is 4 MB. A range of the PBA managed by the element C2 is larger than the page unit 4 KB treated in the NAND-type flash memory. Therefore, the fragments Li3 of the third layer L3 are generated for each element C2, and an address indicating a head of a corresponding fragment Li3 of the third layer L3 is stored in each element C2.

The third layer L3 is divided into the fragments Li3 corresponding to the elements C2 of the second layer L2. One fragment Li3 corresponds to a PBA range of about 4 MB. The one fragment Li3 further includes 32 elements C3. One element C3 corresponds to a PBA range of about 128 KB. That is, a range of the PBA corresponding to the element C3 of the fragment Li3 is 128 KB. A range of the PBA managed by the element C3 is larger than the page unit 4 KB treated in the NAND-type flash memory. Therefore, the fragments Li4 of the fourth layer L4 are generated for each element C3, and an address indicating a head of a corresponding fragment Li4 of the fourth layer L4 is stored in each element C3.

The fourth layer L4 is divided into the fragments Li4 corresponding to the elements C3 of the third layer L3. One fragment Li4 corresponds to a PBA of about 128 KB. The one fragment Li4 further includes 32 elements C4. One element C4 corresponds to a PBA of about 4 KB. That is, a range of the PBA corresponding to the element C4 of the fragment Li4 is 4 KB. A range of the PBA managed by the element C4 is equal to the page unit 4 KB treated in the NAND-type flash memory. Therefore, a PBA indicating data is stored in each element C4.

For example, when a plurality of PBAs stored in one fragment Li4 is continuous, the fragment Li4 may be omitted. The element C3 serving as a reference source of the fragment Li4 includes a PBA of a head of data of about 128 KB which is the range of the PBA corresponding to the element C3. That is, when a range of PBAs corresponding to a plurality of elements included in a certain fragment has been correlated with PBAs in which data with the same size are continuous, a fragment lower than the certain fragment can be omitted and the element included in the certain fragment includes a PBA of a head of the data.

In addition, in each of the namespaces NS1 to NSn, the sizes of ranges of corresponding PBAs (sizes of corresponding memory areas) are different from one another, and for example, the number of PBAs of each of the namespaces NS1 to NSn managed in the hierarchical LUT 51 may be different from one another. In this case, in each of the namespaces NS1 to NSn, for example, the number of layers may be different from one another according to the sizes of the namespaces NS1 to NSn. For example, in the namespace NS1, a PBA range corresponding to 128 GB may be managed in 5 layers, and in the namespace NS2, a PBA range corresponding to 64 GB may be managed in 6 layers.

In the present embodiment, in one namespace, it is desirable that the number of elements included in a fragment be the same; however, the number of elements included in a fragment may differ in each layer.

Figure 4:
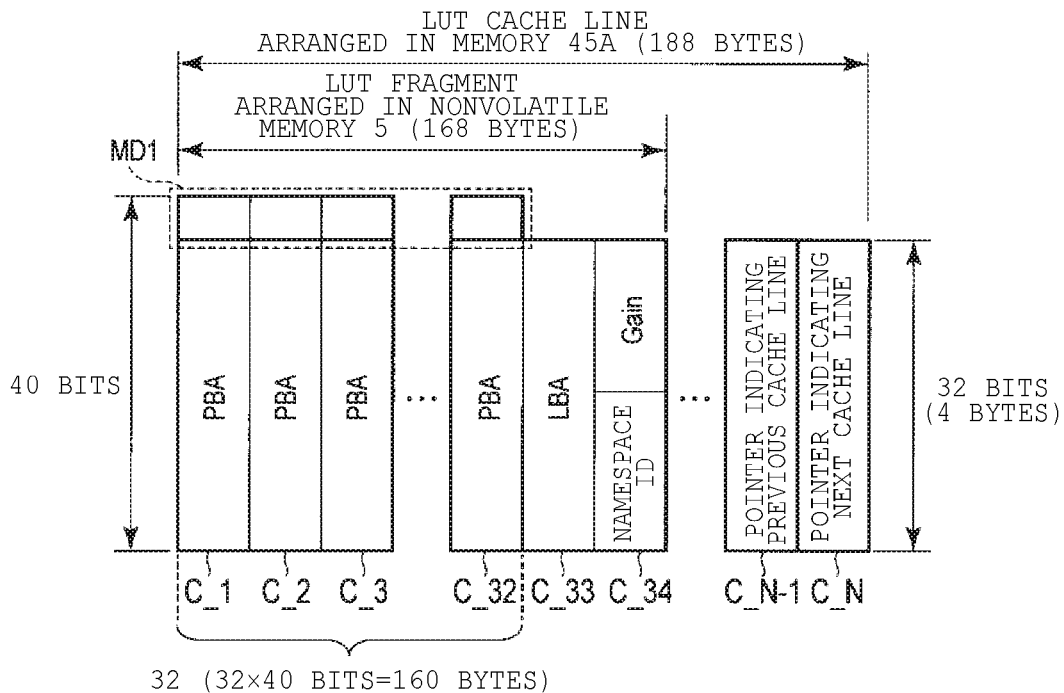
FIG. 4 illustrates a data format of a fragment of the hierarchical look-up table according to the embodiment.

FIG. 4 illustrates a data format of a fragment of the hierarchical LUT 51 according to the present embodiment. Specifically, FIG. 4 illustrates one fragment of the hierarchical LUT 51 in which one fragment of an upper layer corresponds to 32 fragments of a lower layer as illustrated in FIG. 3.

The cache memory 451 stores a part of the hierarchical LUT 51 in units of cache lines. Hereinafter, a fragment of the hierarchical LUT 51 is assumed to be an LUT fragment. A cache line corresponding to the LUT fragment is assumed to be an LUT cache line.

Data updated in the cache memory 451 are written back to the nonvolatile memory 5 in units of cache lines.

The LUT fragment and the LUT cache line correspond to any one of the LUT fragments Li1 to Li4 in each of the layers L1 to L4. The LUT fragment and the LUT cache line, for example, include PBA storage parts C_1 to C_32, an LBA storage part C_33, and a management data storage part C_34.

The PBA storage parts C_1 to C_32 correspond to elements. The PBA storage parts C_1 to C_32 store a PBA corresponding to an LUT fragment of a lower layer or a PBA indicating a data storage position. As illustrated in FIG. 2, one PBA, for example, is written with 32 bits. For example, 8-bit management data MD1 may be added to each PBA. Each management data MD1, for example, may indicate whether a PBA stored in each of the PBA storage parts C_1 to C_32 is the PBA corresponding to the LUT fragment of the lower layer (in this case, whether the PBA is a PBA on the nonvolatile memory 5 or a PBA on the cache memory 451), or is the PBA indicating the data storage position. The size of each of the PBA storage parts C_1 to C_32 may be 40 bits obtained by adding the size of the PBA to the size of the management data MD1, or the total size of the PBA storage parts C_1 to C_32 may be 160 bytes.

The LBA storage part C_33 stores an LBA corresponding to the PBA storage part C_1 (that is, a PBA of a head managed in the LUT fragment).

The management data storage part C_34 stores a namespace ID to which the LUT fragment belongs, and a range of the PBA managed in the LUT fragment.

The management data storage part C_34 may store other types of information. For example, the management data storage part C_34 may store an ID of a layer to which the LUT fragment belongs.

When each LUT fragment, for example, is stored on the cache memory 451 of the memory 45A, each LUT cache line may further include pointers indicating LUT cache lines to be associated with each other in the cache memory 451, in addition to the LUT fragment. More specifically, the LUT cache line may include a previous pointer storage part C_N−1 indicating a cache line which is referred to before the LUT cache line, and a next pointer storage part C_N indicating a cache line which is referred to after the LUT cache line. As described above, the LUT cache line stored in the cache memory 451 includes pointers of the previous and next cache lines to be referred to, so that it is possible to increase an access speed for the cache memory 451 and to perform continuous access. In addition, the LUT cache line may include other pieces of management data.

For example, when a certain cache line is included in a free list FL (described below), a next pointer storage part C_N of the cache line may include a pointer indicating another cache line included in the same free list FL. When a certain cache line is included in a dirty list DL (described below), a next pointer storage part C_N of the cache line may include a pointer indicating another cache line included in the same dirty list DL. When a certain cache line is included in a clean list CL (described below), a next pointer storage part C_N of the cache line may include a pointer indicating another cache line included in the same clean list CL.

In the present embodiment, an address of a cache line to be next referred to is written as a PBA; however, the address may be written in other formats. Furthermore, in the present embodiment, the previous pointer storage part C_N−1 and the next pointer storage part C_N store a PBA; however, the previous pointer storage part C_N−1 and the next pointer storage part C_N may store addresses of other formats.

It is desirable that the LUT fragment and the LUT cache line be all configured according to the format illustrated in FIG. 4. In this case, the size of each LUT fragment can be set to a fixed length (for example, 168 bytes). The size of each LUT cache line can be set to a fixed length (for example, 188 bytes). However, each LUT fragment and each LUT cache line may be configured according to formats different in each layer.

Figure 5:
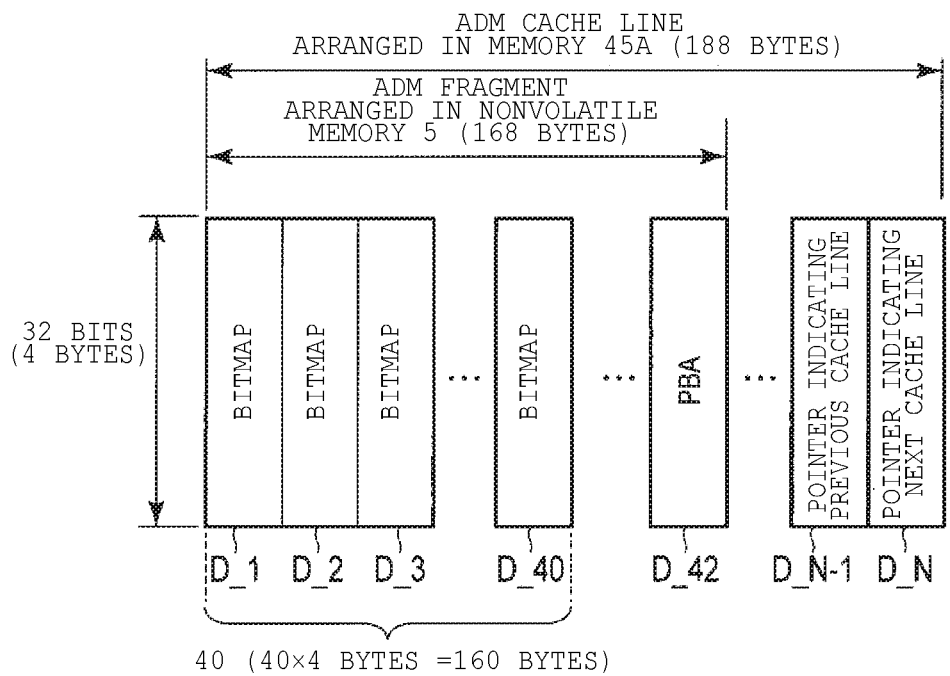
FIG. 5 illustrates a data format of a fragment of the active data map according to the embodiment.

FIG. 5 illustrates a data format of a fragment of the ADM 52 according to the present embodiment.

The cache memory 451 stores a part of the ADM 52 in units of cache lines. Hereinafter, a fragment of the ADM 52 is assumed to be an ADM fragment. A cache line corresponding to the ADM fragment is assumed to be an ADM cache line.

The ADM fragment and the ADM cache line, for example, include map storage parts D_1 to D_40 and a PBA storage part D_42.

The map storage parts D_1 to D_40 store a bit indicating validity or invalidity of each data for each 4 KB data stored in the nonvolatile memory 5. For example, when the total size of the map storage parts D_1 to D_40 is set as 160 bytes (=1280 bits), it is possible to indicate the validity or invalidity of about 1280 pieces of 4 KB data to be stored in the nonvolatile memory 5 with one ADM fragment and one ADM cache line.

The PBA storage part D_42 stores a PBA of the map storage part D_1 (that is, a PBA of a head managed in the ADM fragment).

The ADM cache line may further include pointers indicating cache lines to be associated with each other in the cache memory 451, similarly to the LUT cache line. More specifically, the ADM cache line includes a previous pointer storage part D_N−1 indicating a cache line which is referred to before the ADM cache line, and a next pointer storage part D_N indicating a cache line which is referred to after the ADM cache line. In addition, the ADM cache line may include other pieces of management data.

Furthermore, it is desirable that the ADM fragment and the ADM cache line be all configured according to the format illustrated in FIG. 5 and have fixed lengths which are equal to the sizes of the LUT fragment and the LUT cache line. That is, it is preferable that the ADM fragment have the same size of 168 bytes as that of the LUT fragment, and the ADM cache line have the same size of 188 bytes as that of the LUT cache line.

Figure 6:
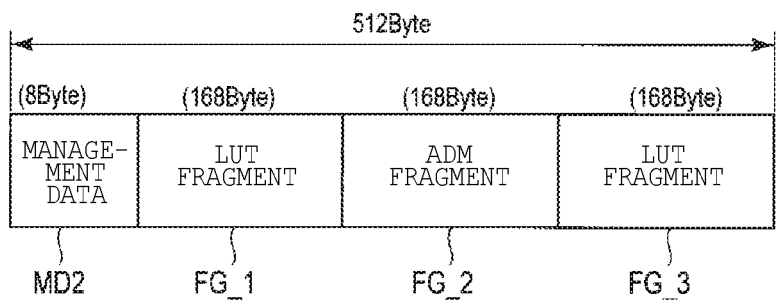
FIG. 6 illustrates a data format used in writing back from a cache memory to a nonvolatile memory according to the embodiment.

FIG. 6 illustrates a data format used at the time of writing back to the nonvolatile memory 5 from the cache memory 451 according to the present embodiment.

As described above, when the LUT cache line or the ADM cache line is updated in the cache memory 451, an LUT fragment included in the updated LUT cache line or an ADM fragment included in the updated ADM cache line is written back to the nonvolatile memory 5.

In the present embodiment, since the sizes of the LUT fragments and the ADM fragments are all equal to each other, the write control section 441 can efficiently write the LUT fragments and the ADM fragments back to the nonvolatile memory 5.

Specifically, for example, as illustrated in FIGS. 4 and 5, the size of the LUT fragments written back to the nonvolatile memory 5 is all 168 bytes without depending on layers. Furthermore, the ADM fragments have the same size of 168 bytes as that of the LUT fragments. For example, as illustrated in FIG. 6, when a data unit (hereinafter, referred to as a write-back unit), in which writing back to the nonvolatile memory 5 from the cache memory 451 is performed, is assumed to be 512 bytes, one write-back unit can include arbitrary three fragments FG_1 to FG_3 selected from among the LUT fragments and the ADM fragments stored in the cache memory 451. A remainder size obtained by excluding the fragments FG_1 to FG_3 from the write-back unit is 8 bytes. The 8 bytes are sufficiently smaller than the write-back unit (512 bytes). Moreover, for example, since it is typical that the page size of the NAND-type flash memory is an integer times of 512 bytes, the remainder size is also sufficiently smaller than the page size. Consequently, when the data format in FIG. 6 is used, it is possible to reduce waste of a capacity of a page to be written in the nonvolatile memory 5 at the time of writing back and to perform efficient writing back of cache lines.

In addition, one write-back unit may include management data MD2 using the remainder size (8 bytes) of the write-back unit. For example, the management data MD2 may represent the type of three fragments stored in one write-back unit.

The write-back unit is not limited to 512 bytes. The write-back unit, for example, may be 1 KB or 2 KB. However, it is desirable that the write-back unit be a multiple of 512 bytes.

Furthermore, when any one of the LUT fragment and the ADM fragment is transmitted/received between the nonvolatile memory controller 46 and the nonvolatile memory 5, a fragment including an ECC (Error Correcting Code) may be transmitted and received. In this case, for example, the number of fragments included in one write-back unit and the sizes of the fragments are adjusted, so that it is possible to add the ECC to a plurality of fragments efficiently and to efficiently perform fragment transmission/reception.

Figure 7:
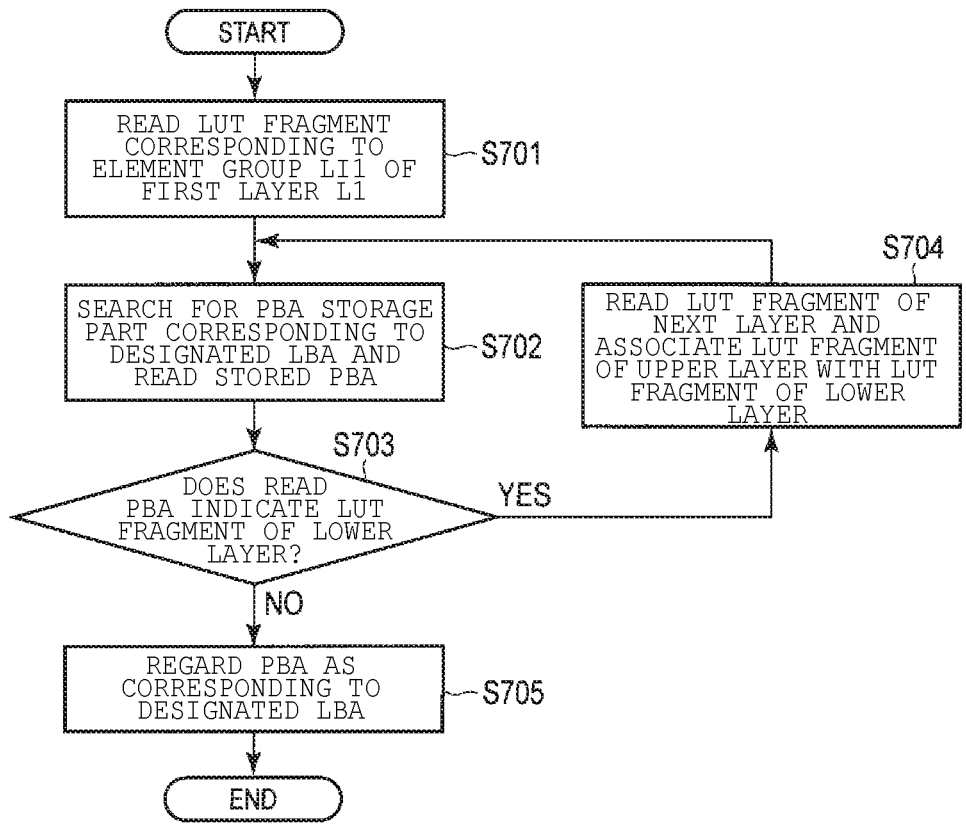
FIG. 7 is a flowchart illustrating a physical address search process according to the embodiment.

FIG. 7 is a flowchart illustrating a PBA search process according to the present embodiment.

Specifically, in the PBA search process, the address conversion section 445 of the processor 44 converts a designated LBA into a PBA by referring to the hierarchical LUT 51.

The hierarchical LUT 51 has been generated in advance by the initialization section 444 of the processor 44, the address conversion section 445 in a write process, and the like, and has been stored in the nonvolatile memory 5.

In step S701, the cache memory control section 447 reads the LUT fragment Li1 of the first layer L1 of the hierarchical LUT 51 stored in the nonvolatile memory 5 via the nonvolatile memory controller 46, and stores the LUT fragment Li1 in the cache memory 451 in the memory 45A. The reading of the LUT fragment Lit, for example, may be performed when the memory device 3 starts operating. Furthermore, the reading of the LUT fragment Li1 may be performed based on the namespace ID designated by the information processing device 2.

In step S702, the address conversion section 445 searches for a PBA storage part corresponding to the designated LBA with respect to the read LUT fragment Lit, and reads a PBA stored in the PBA storage part.

In step S703, the address conversion section 445 determines whether the PBA read in step S702 is a PBA indicating an LUT fragment of a lower layer.

When the read PBA is not the PBA indicating the LUT fragment of the lower layer (No in step S703), the address conversion section 445 regards that the read PBA is an address corresponding to the designated LBA and ends the search process in step S705.

When the read PBA is the PBA indicating the LUT fragment of the lower layer (Yes in step S703), the cache memory control section 447 reads the LUT fragment of the lower layer corresponding to the read PBA in step S704. The cache memory control section 447 stores a pointer, which indicates an LUT cache line corresponding to the LUT fragment of the lower layer to be stored in the cache memory 451, in the next pointer storage part C_N of any cache line belonging to the clean list CL, thereby representing that the LUT cache line corresponding to the LUT fragment of the lower layer belongs to the clean list CL. The cache memory control section 447 stores a pointer, which indicates a cache line belonging to the clean list CL, in the previous pointer storage part C_N−1 of the LUT cache line corresponding to the LUT fragment of the lower layer. Then, the process returns to step S702.

In step S704, when a reference destination of the fragment of the lower layer read in step S703 indicates a PBA of the nonvolatile memory 5, the cache memory control section 447 reads the lower fragment from the hierarchical LUT 51 of the nonvolatile memory 5, and stores the read lower fragment in the cache memory 451 of the memory 45A. When the reference destination of the fragment of the lower layer read in step S703 indicates a PBA of the cache memory 451, the reading process of the cache memory control section 447 from the hierarchical LUT 51 of the nonvolatile memory 5 to the cache memory 451 of the memory 45A is not required.

FIG. 8 is a block diagram illustrating a relation of cache lines in the PBA search process according to the present embodiment. A configuration of the hierarchical LUT 51 in FIG. 8 is the same as that of the hierarchical LUT 51 illustrated in FIG. 3.

FIG. 8 illustrates the state in which LUT cache lines CLi1, CLi2 (1), CLi3 (2), and CLi4 (20) are read up to the fourth layer L4 from the first layer L1.

In the first layer L1, the LUT cache line CLi1 corresponding to the LUT fragment Li1 includes PBA storage parts C1_1 to C1_32. The PBA storage parts C1_1 to C1_32 correspond to a range of a PBA of 128 MB, respectively. The PBA storage parts C1_1 to C1_32 store PBAs corresponding to 32 LUT fragments Li2 of the second layer L2, respectively. In FIG. 8, the PBA storage parts C1_1 to C1_32 include PBAs corresponding to the LUT cache lines CLi2 (1) to CLi2 (32) in the second layer L2, respectively.

In the second layer L2, the LUT cache line CLi2(1) corresponding to the LUT fragment Li2 includes PBA storage parts C2(1)_1 to C2(1)_32. The PBA storage parts C2(1)_1 to C2(1)_32 correspond to a range of a PBA of 4 MB, respectively. The PBA storage parts C2(1)_1 to C2(1)_32 store PBAs corresponding to 32 LUT fragments Li3 of the third layer L3, respectively. In FIG. 8, the PBA storage parts C2(1)_1 to C2(1)_32 include PBAs corresponding to the LUT cache lines CLi3 (1) to CLi3 (32) in the third layer L3, respectively.

In the third layer L3, the LUT cache line CLi3(2) corresponding to the LUT fragment Li3 includes PBA storage parts C3(2)_1 to C3(2)_32. The PBA storage parts C3(2)_1 to C3(2)_32 correspond to a range of a PBA of 128 KB, respectively. The PBA storage parts C3(2)_1 to C3(2)_32 store PBAs corresponding to 32 LUT fragments Li4 of the fourth layer L4, respectively. In FIG. 8, the PBA storage parts C3(2)_1 to C3(2)_32 include PBAs corresponding to the LUT cache lines CLi4 (1) to CLi4 (32) in the fourth layer L4, respectively.

In the fourth layer L4, the LUT cache line CLi4(20) corresponding to the LUT fragment Li4 includes PBA storage parts C4(20)_1 to C4(20)_32. The PBA storage parts C4(20)_1 to C4 (20)_32 correspond to a range of a PBA of 4 KB, respectively. The PBA storage parts C4(20)_1 to C4(20)_32 store PBAs corresponding to data, respectively.

First, the cache memory control section 447, for example, reads the LUT fragment Li1 of the first layer L1 from the nonvolatile memory 5 based on a namespace ID, an LBA Y, a head address, and an offset value, and stores the LUT cache line CLi1 corresponding to the LUT fragment Li1 in the cache memory 451.

Then, the address conversion section 445, for example, reads a PBA stored in the corresponding PBA storage part C1_1 from the LUT cache line CLi1 corresponding to the LUT fragment Li1 based on the LBA Y, the head address, and the offset value.

Since a value stored in the PBA storage part C1_1 is a PBA indicating the LUT fragment Li2 of the second layer L2, the cache memory control section 447 reads the LUT fragment Li2 from the nonvolatile memory 5 and stores the LUT cache line CLi2 (1) corresponding to the LUT fragment Li2 in the cache memory 451.

Then, the address conversion section 445 searches for the PBA storage part C2(1)_2 to which a range of an LBA including the LBA Y has been assigned, and reads the PBA stored in the PBA storage part C2(1)_2.

Since a value stored in the PBA storage part C2(1)_2 is a PBA indicating the LUT fragment Li3 of the third layer L3, the cache memory control section 447 reads the LUT fragment Li3 from the nonvolatile memory 5 and stores the LUT cache line CLi3 (2) corresponding to the LUT fragment Li3 in the cache memory 451.

Then, the address conversion section 445 searches for the PBA storage part C3(2)_20, to which the range of the LBA including the LBA Y has been assigned, from the LUT cache line CLi3 (2), and reads the PBA stored in the PBA storage part C3(2)_20.

Since a value stored in the PBA storage part C3(2)_20 is a PBA indicating the LUT fragment Li4 of the fourth layer L4, the cache memory control section 447 reads the LUT fragment Li4 from the nonvolatile memory 5 and stores the LUT cache line CLi4 (20) corresponding to the LUT fragment Li4 in the cache memory 451.

Then, the address conversion section 445 searches for the PBA storage part C4 (20)_31, to which the range of the LBA including the LBA Y has been assigned, from the LUT cache line CLi4 (20), and reads a PBA X stored in the PBA storage part C4 (20)_31. The PBA X stored in the PBA storage part C4 (20)_31 indicates data other than an LUT cache line. Therefore, the address conversion section 445 can specify the PBA X corresponding to the LBA Y.

Figure 9:
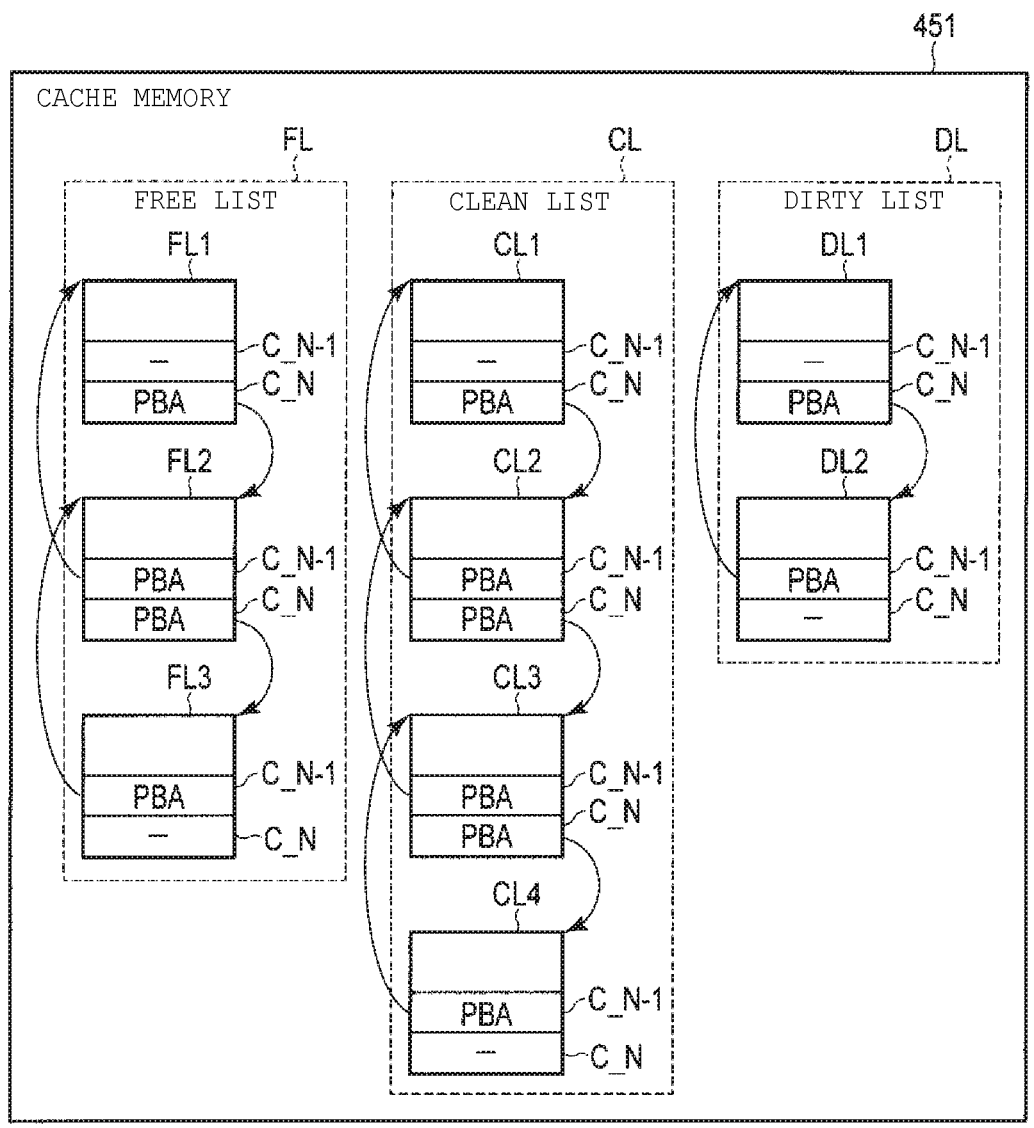
FIG. 9 illustrates a list structure of the cache memory according to the embodiment.

FIG. 9 illustrates a list structure of the cache memory 451 according to the present embodiment.

In the present embodiment, the cache line may be the LUT cache line or the ADM cache line.

When the LUT fragments of the hierarchical LUT 51 are stored on the cache memory 451 as the LUT cache lines or when the ADM fragments of the ADM 52 are stored on the cache memory 451 as the ADM cache lines, the cache memory control section 447 generates a list structure by connecting the cache lines stored on the cache memory 451 as illustrated in FIGS. 4 and 5.

In the present embodiment, the cache memory 451 includes the free list FL, the dirty list DL, and the clean list CL. It is desirable that the LUT cache lines and the ADM cache lines be managed in different lists. In this case, it is desirable that the list for managing the LUT cache lines and the list for managing the ADM cache lines have the same format.

In FIG. 9, next pointer storage parts C_N of cache lines belonging to the free list FL, the dirty list DL, and the clean list CL store addresses of cache lines belonging to the same list and next connected. When there are no cache lines to be next connected, the next pointer storage parts C_N may be omitted. Previous pointer storage parts C_N−1 of the cache lines store addresses of cache lines belonging to the same list and previously connected. When there are no cache lines previously connected, the previous pointer storage parts C_N−1 may be omitted.

The free list FL includes, for example, cache lines FL1 to FL3 which do not belong to both the dirty list DL and the clean list CL and are to be rewritten. Cache lines immediately after being stored in the cache memory 451 from the hierarchical LUT 51 or the ADM 52 belong to the free list FL. An alignment sequence of the cache lines FL1 to FL3 belonging to the free list FL may be random. The next pointer storage part C_N of the cache line FL1 and the previous pointer storage part C_N−1 of the cache line FL3 store a PBA of the cache line FL2. The next pointer storage part C_N of the cache line FL2 stores a PBA of the cache line FL3. The previous pointer storage part C_N−1 of the cache line FL2 stores a PBA of the cache line FL1.

The dirty list DL, for example, includes cache lines DL1 and DL2 which have been rewritten in the cache memory 451, wherein the content of the rewritten cache lines DL1 and DL2 are not reflected in the hierarchical LUT 51 of the nonvolatile memory 5. An alignment sequence of the cache lines DL1 and DL2 belonging to the dirty list DL may be random. The next pointer storage part C_N of the cache line DL1 stores a PBA of the cache line DL2. The previous pointer storage part C_N−1 of the cache line DL2 stores a PBA of the cache line DL1.

For example, when the communication interface control unit 41 receives a write command by the information processing device 2 and the like, the cache memory control section 447 switches an LUT cache line corresponding to an LBA of a write destination from the free list FL to the dirty list DL.

The content of the cache lines DL1 and DL2 belonging to the dirty list DL needs to be reflected (written) in the hierarchical LUT 51 or the ADM 52 of the nonvolatile memory 5. After the cache lines DL1 and DL2 in the dirty list DL are written in the nonvolatile memory 5, since the cache lines DL1 and DL2 do not need to be managed in the dirty list DL, the cache lines DL1 and DL2 are switched from the dirty list DL to the clean list CL by the cache memory control section 447. Therefore, it is desirable that the cache lines DL1 and DL2 belonging to the dirty list DL be written to the nonvolatile memory 5 in a fast-in-fast-out (FIFO) manner, and be converted to cache lines belonging to the clean list CL.

For example, the dirty list DL is used in order to increase the speed of a write process with respect to the nonvolatile memory 5.

The clean list CL includes cache lines CL1 to CL4 having the same content in the cache memory 451 and the hierarchical LUT 51 or the ADM 52 of the nonvolatile memory 5. The cache lines CL1 to CL4, for example, are cache lines rewritten in the cache memory 451 and reflected with respect to the hierarchical LUT 51 of the nonvolatile memory 5. An alignment sequence of the cache lines CL1 to CL4 belonging to the clean list CL may be random. The next pointer storage part C_N of the cache line CL1 and the previous pointer storage part C_N−1 of the cache line CL3 store a PBA of the cache line CL2. The next pointer storage part C_N of the cache line CL2 and the previous pointer storage part C_N−1 of the cache line CL4 store a PBA of the cache line CL3. The previous pointer storage part C_N−1 of the cache line CL2 stores a PBA of the cache line CL1. The next pointer storage part C_N of the cache line CL3 stores a PBA of the cache line CL4.

For example, when the communication interface control unit 41 receives a read command by the information processing device 2 and the like, the cache memory control section 447 switches a cache line corresponding to an LBA of a read destination from the free list FL to the clean list CL.

Since the cache lines CL1 to CL4 belonging to the clean list CL have the same content as that of a part of the hierarchical LUT 51 of the nonvolatile memory 5, even when the cache lines CL1 to CL4 belonging to the clean list CL have been lost, there is no mismatch between the cache lines CL1 to CL4 of the cache memory 451 and data of the hierarchical LUT 51 or the ADM 52 stored in the nonvolatile memory 5. Therefore, for example, when the total size of the free list FL has been reduced to be equal to or less than a predetermined threshold value, the cache memory control section 447 may move a space for the cache lines of the clean list CL to be used as a space for the free list FL. Specifically, the cache memory control section 447 may erase the data in the clean list or move the cache line in the clean list LC to the free list FL. The clean list CL may be managed in a fast-in-fast-out manner. An increase or a decrease in the clean list CL may not be managed. That is, the number of lists may randomly increase or decrease.

Hereinafter, details of a state change of the cache memory 451 when the memory device 3 has received a read command and a write command will be described.

Figure 10:
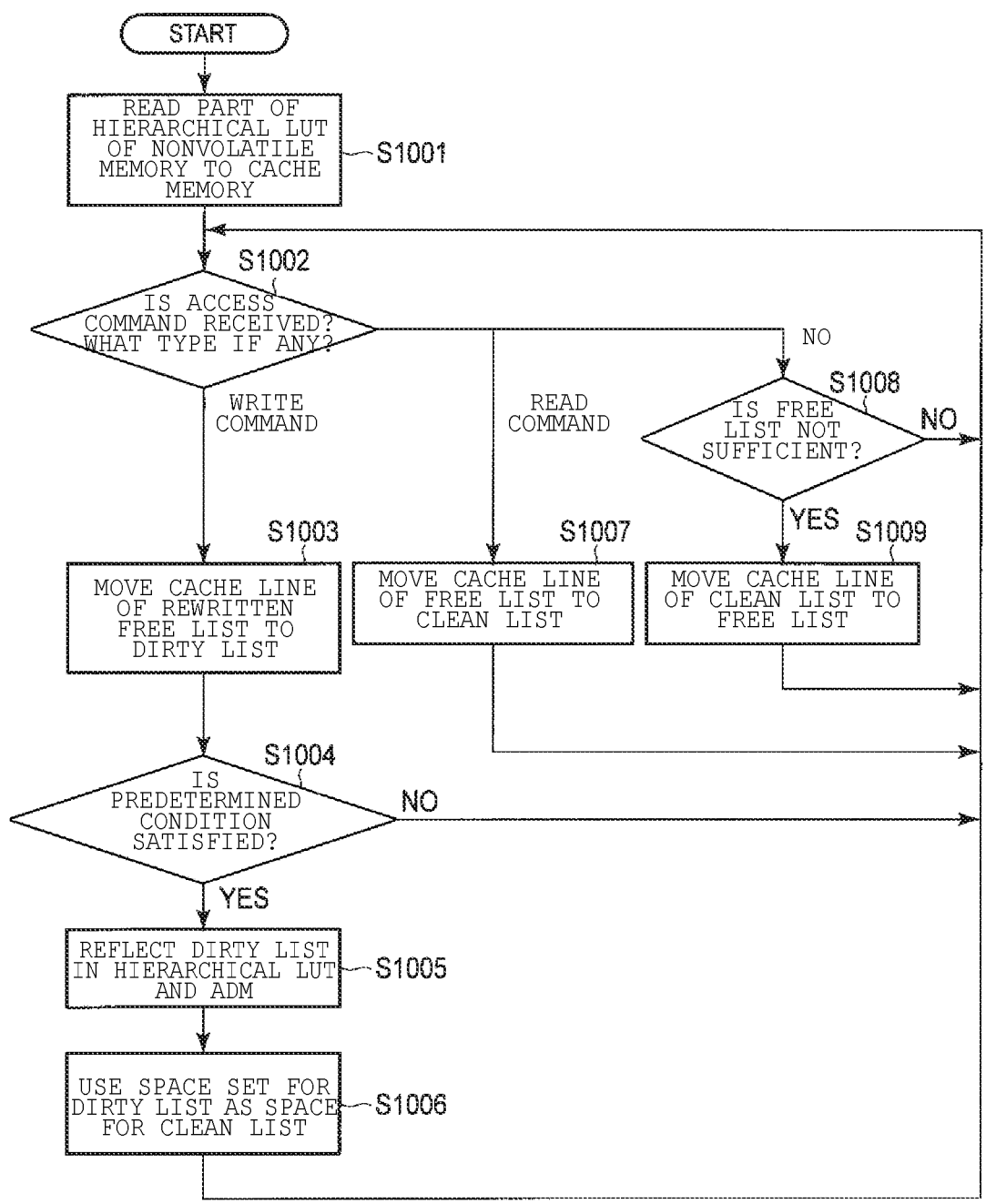
FIG. 10 is a flowchart illustrating a state change in the cache lines in the cache memory according to the embodiment.

FIG. 10 is a flowchart illustrating a state change of a cache line in the cache memory 451 according to the present embodiment.

Figure 11:
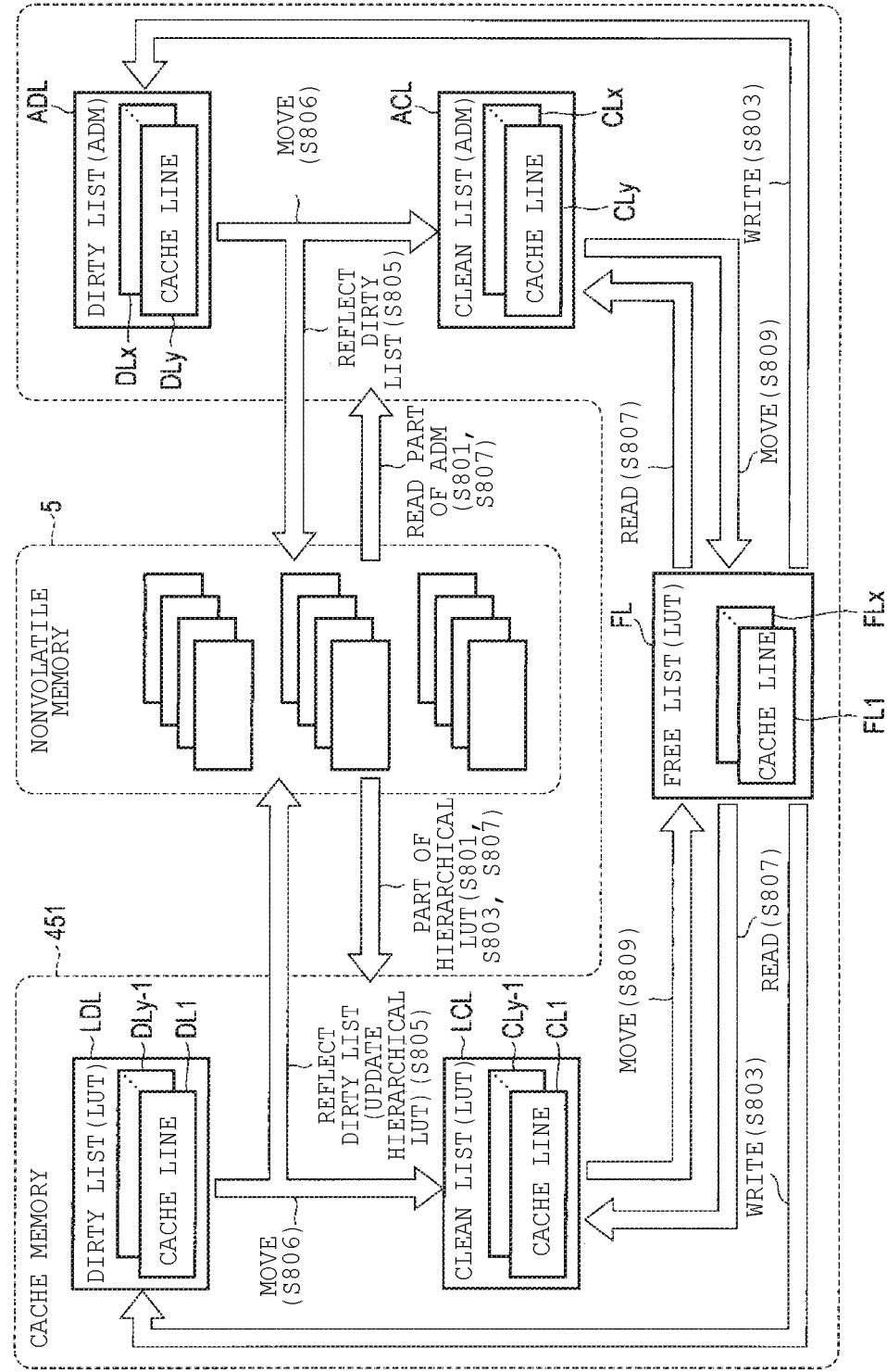
FIG. 11 schematically illustrates a state change in the cache line in the cache memory according to the embodiment.

FIG. 11 schematically illustrates the state change of a cache line in the cache memory 451 according to the present embodiment. FIG. 11 illustrates a procedure illustrated in the flowchart in FIG. 10.

In step S1001, the cache memory control section 447 reads a part of the hierarchical LUT 51 from the nonvolatile memory 5, and stores cache lines FL1 to FLx belonging to the free list FL in the cache memory 451. For example, similarly to step S701 in FIG. 7, in step S1001, a cache line CLi1 corresponding to the fragment Li1 of the uppermost first layer L1 of the hierarchical LUT 51 is stored in the cache memory 451.

In step S1002, the cache memory control section 447 determines whether or not an access command for the nonvolatile memory 5 has been received from the information processing device 2 via the communication interface control unit 41. When a write command has been received, the process proceeds to step S1003, and when a read command has been received, the process proceeds to step, S1007. When the access command has not been received, the process proceeds to step S1008.

In step S1003, the address conversion section 445 searches for a PBA corresponding to an LBA of a write destination with respect to the cache lines FL1 to FLx of the free list FL. The search process for the hierarchical LUT 51 or the cache memory 451 is similar to the search process illustrated in FIGS. 7 and 8.

The cache memory control section 447 reads an LUT fragment, which has not been stored in the cache memory 451, from the hierarchical LUT 51 searched by the address conversion section 445, and stores the read LUT fragment in the cache memory 451 as any one of the cache lines FL1 to FLx belonging to the free list FL. Furthermore, the cache memory control section 447 reads an ADM fragment, which includes an ADM corresponding to the PBA of the write destination, from the ADM 52, and stores the read ADM fragment in the cache memory 451 as any one of the cache lines FL1 to FLx belonging to the free list FL. Moreover, when an LUT cache line of the cache lines FL1 to FLx of the free list FL has been rewritten by the address conversion section 445, the cache memory control section 447 moves the rewritten LUT cache line to a dirty list LDL corresponding to the hierarchical LUT 51. Similarly, when an ADM cache line of the cache lines FL1 to FLx of the free list FL has been rewritten by the data map management section 446, the cache memory control section 447 moves the rewritten ADM cache line to a dirty list ADL corresponding to the ADM 52.

In step S1004, the cache memory control section 447 determines whether or not a predetermined condition for reflecting cache lines DL1 to DLy−1 and DLy to DLx of the dirty lists LDL and ADL to the hierarchical LUT 51 and the ADM 52 of the nonvolatile memory 5 is satisfied. The condition may be satisfied, for example, when the sizes of the dirty lists LDL and ADL have exceeded a predetermined threshold value. When the condition is not satisfied, the process returns to step S1002. When the condition is satisfied, the cache memory control section 447 reflects the cache lines DL1 to DLy−1 and DLy to DLx of the dirty lists LDL and ADL to the hierarchical LUT 51 and the ADM 52 of the nonvolatile memory 5 in step S1005 (writing).

The determination of step S1004 may be regularly performed by the cache memory control section 447 even when there is no write command in step S1002.

In step S1006, the cache memory control section 447 moves the cache lines of the dirty list LDL, which have been completely reflected to the hierarchical LUT 51, to the clean list LCL corresponding to the hierarchical LUT 51. The cache memory control section 447 moves the cache lines of the dirty list ADL, which have been completely reflected to the ADM 52, to the clean list ACL corresponding to the ADM 52. Then, the process returns to step S1002.

In step S1007, the address conversion section 445 searches for a PBA corresponding to an LBA of a read destination with respect to the cache lines FL1 to FLx of the free list FL. The cache memory control section 447 stores the LUT fragment of the hierarchical LUT 51, which has been searched in the search process but has not been stored in the cache memory 451, in the cache memory 451 as any one of the cache lines FL1 to FLx belonging to the free list FL, and then moves the LUT fragment to the clean list LCL. Furthermore, the cache memory control section 447 reads the ADM fragment, which includes an ADM corresponding to a PBA of the read destination, from the ADM 52, stores the read ADM fragment in the cache memory 451 as any one of the cache lines FL1 to FLx belonging to the free list FL, and then moves the ADM fragment to the clean list ACL. Then, the process returns to step S1002.

In step S1008, the cache memory control section 447 checks the size of the free list FL. When the free list FL is sufficient, the process returns to step S1002. When the free list FL is not sufficient, the cache memory control section 447 moves a space for the cache lines of the clean lists LCL and ACL to be used as a space for the free list FL in step S1009. Then, the process returns to step S1002.

FIG. 10 illustrate an example in which the cache lines are moved to the dirty lists LDL and ADL from the free list FL; however, cache lines rewritten in the clean lists LCL and ACL may also be moved to the dirty lists LDL and ADL. In the aforementioned example, the LUT fragment or the ADM fragment read from the hierarchical LUT 51 or the ADM 52 of the nonvolatile memory 5 is stored in the cache memory 451 so as to belong to the free list FL; however, instead, the LUT fragment or the ADM fragment may be stored in the cache memory 451 so as to belong to the clean lists LCL and ACL.

The cache lines DL1 to DLy−1 and DLy to DLx of the dirty lists LDL and ADL may be reflected in the hierarchical LUT 51 or the ADM 52 of the nonvolatile memory 5 at a specific timing regardless of the aforementioned determination of step S1004. For example, when power of the memory device 3 is lost, it may be possible to ensure a separate power source for supplying power, to the memory device 3, corresponding to a time for writing the cache lines DL1 to DLy−1 and DLy to DLx of the dirty lists LDL and ADL to the hierarchical LUT 51 or the ADM 52. In this case, power is supplied from the separate power source to the memory device 3 at a timing at which the power of the memory device 3 is lost, so that the cache lines DL1 to DLy−1 and DLy to DLx of the dirty lists LDL and ADL are written to the hierarchical LUT 51 or the ADM 52 of the nonvolatile memory 5. In this case, the sizes of the dirty lists LDL and ADL are reduced, so that it is possible to reduce the capacity of the ensured separate power source and to suppress cost required for the memory device 3. Furthermore, the sizes of the dirty lists LDL and ADL are reduced, so that it is possible to shorten a time for reflecting the cache lines DL1 to DLy−1 and DLy to DLx of the dirty lists LDL and ADL to the hierarchical LUT 51 or the ADM 52 at the time of power supply from the separate power source, and thus to enhance safety.

Since it is possible to adjust the sizes of the dirty lists LDL and ADL by a threshold value and the like, it is possible to adjust the frequency by which the cache lines DL1 to DLy−1 and DLy to DLx of the dirty lists LDL and ADL are reflected to the hierarchical LUT 51 and the ADM 52. In this way, it is possible to adjust an access frequency to the nonvolatile memory 5, a processing speed of the memory device 3, and the lifetime of the nonvolatile memory 5. Since the memory device 3 can manage the sizes of the dirty lists LDL and ADL and change the sizes of the dirty lists LDL and ADL in accordance with a command from the information processing device 2 and the like, it is possible to ensure the balance of cost, safety, performance, and lifetime of the memory device 3.

Figure 12:
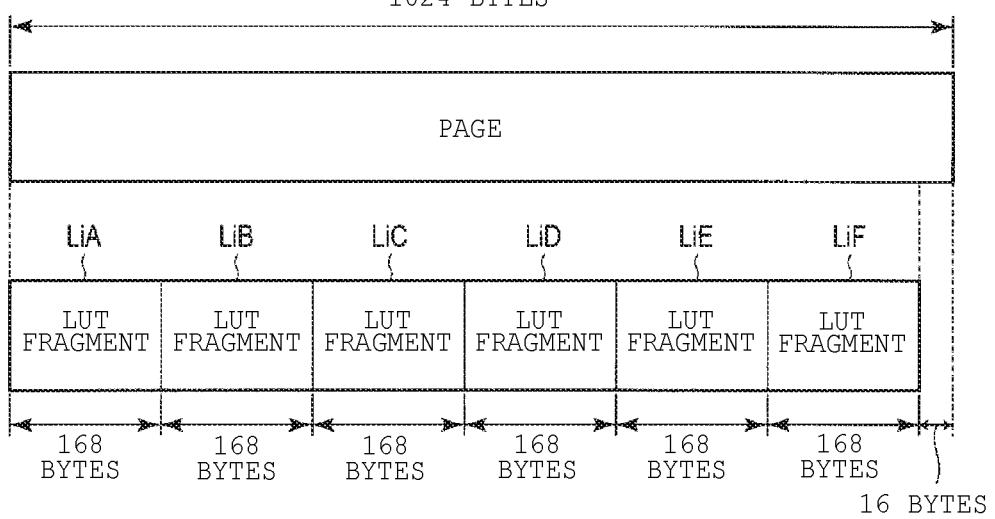
FIG. 12 illustrates a relation between the fragments of the hierarchical look-up table and a page of the nonvolatile memory according to the embodiment.

FIG. 12 illustrates a relation between the LUT fragment and the page of the nonvolatile memory 5 according to the present embodiment. Hereinafter, the LUT fragment and the LUT cache line will be described, but the ADM fragment and the ADM cache line are also similar. FIG. 12 illustrates the case in which all fragments included in a page are the LUT fragments. However, fragments included in the page may be the ADM fragments. In the page, both the LUT fragments and the ADM fragments may exist.

In the present embodiment, when the hierarchical LUT 51 is generated, the LUT fragment includes the same number of elements in all layers as described above. In this case, all the sizes of the LUT fragments are equal to one another and all the sizes of the LUT cache lines are equal to one another. The sizes of the LUT fragments are allowed to be equal to one another and the sizes of the LUT cache lines are allowed to be equal to one another, so that it is possible to efficiently store the hierarchical LUT 51 in the nonvolatile memory 5.

Specifically, for example, in the case of using the format of the aforementioned LUT fragment and LUT cache line illustrated in FIG. 4, the size of each of the LUT fragments of the hierarchical LUT 51 arranged on the nonvolatile memory 5 are 168 bytes regardless of layers.

For example, as illustrated in FIG. 12, when the page size of the nonvolatile memory 5 is set as 1024 bytes, one page includes six LUT fragments LiA to LiF. In this case, the remainder size of the page is 16 bytes, and is a sufficiently small value with respect to the capacity (1024 bytes) of one page. Consequently, it is possible to suppress waste of the capacity of a page and to efficiently manage LUT fragments.

When LUT fragments are transmitted/received between the nonvolatile memory controller 46 and the nonvolatile memory 5, LUT fragments including an ECC (Error-Correcting Code) may be transmitted/received. In this case, for example, the number of LUT fragments included in one page and the sizes of the LUT fragments are adjusted, so that it is possible to add the ECC to a plurality of LUT fragments without any waste and efficiently perform the transmission/reception of the LUT fragments.

As described above, in the aforementioned embodiment, address conversion data for converting a logical address into a physical address are hierarchically structured, so that it is possible to efficiently store data of a part of the hierarchical LUT 51 in the cache memory 451, and to manage the data.

In the present embodiment, a plurality of fragments included in the hierarchical LUT 51 has the same size. Consequently, it is possible to efficiently perform a process of reading fragments from the nonvolatile memory 5 and storing the fragments in the cache memory 451, and a process of reading the fragments from the cache memory 451 and storing the fragments in the nonvolatile memory 5.

In the present embodiment, the hierarchical LUT 51 has a hierarchical structure for converting a logical address into a physical address for each namespace. Therefore, when address conversion of the same namespace is continued, it is possible to enhance a probability that fragments required for the address conversion will be stored in the cache memory 451, to improve the speed of the address conversion, and to reduce throughput of cash-in, cash-out, and the like.

In the hierarchical LUT 51 according to the present embodiment, it is possible to decrease the number of hierarchical layers of a namespace with a small storage capacity, to increase the number of hierarchical layers of a namespace with a large storage capacity, and to construct an efficient data structure according to the storage capacity of a namespace.

In the present embodiment, the size of each fragment included in the hierarchical LUT 51 is allowed to be approximately equal to a unit size of a cache line included in the cache memory 451, so that it is possible to perform cash-in and cash-out by a fragment unit or an integer multiple of a fragment, and to efficiently perform the management of the cache memory 451, for example.

In the present embodiment, cache lines stored in the cache memory 451 are allowed to belong to any one of the dirty list DL, the clean list CL, and the free list FL, so that it is possible to easily understand the states of fragments corresponding to the cache lines.

In the present embodiment, the hierarchical LUT 51 is generated by the initialization section 444 and the address conversion section 445, so that it is possible to reduce the size of an LUT read to the cache memory 451 of the memory 45A at a time. In this way, it is possible to shorten a time required for reading the LUT. Furthermore, only the cache lines of the first layer L1 are read when the memory device 3 starts operating, so that it is possible to increase a speed at which the memory device 3 starts operating. Consequently, it is possible to enhance the convenience of the memory device 3.

In the present embodiment, the memory device 3 may manage the size of the dirty list DL included in the cache memory 451, and change the size of the dirty list DL by a command from the information processing device 2 and the like. In this way, it is possible to control the generation frequency of a process of writing cache lines back to the hierarchical LUT 51 from the cache memory 451, and to ensure the balance of cost, safety, performance, and lifetime of the memory device 3.

In the present embodiment, in one namespace of the hierarchical LUT 51, the number of elements included in a fragment, for example, is allowed to be constant between layers, so that it is possible to efficiently store the hierarchical LUT 51 on the nonvolatile memory 5. Furthermore, it is possible to efficiently perform transmission/reception of cache lines between the nonvolatile memory controller 46 and the nonvolatile memory 5.

In the present embodiment, the sizes of the ADM fragment and the LUT fragment are allowed to be equal to each other, and the sizes of the ADM cache line and the LUT cache line are further allowed to be equal to each other. In this way, the cache memory control section 447 can efficiently manage the ADM cache line and the LUT cache line with the free list FL, the clean list CL, and the dirty list DL having the same format. For example, the free lists of the ADM cache line and the LUT cache line are allowed to be common, so that it is possible to efficiently use the capacity of the cache memory 451. Furthermore, the write control section 441 can allow the ADM fragment and the LUT fragment to exist in one write-back unit and page and write the ADM fragment and the LUT fragment back to the nonvolatile memory 5 without distinguishing the ADM fragment and the LUT fragment from each other. In this way, it is possible to suppress waste in the capacity of a page and efficiently write back cache lines.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a nonvolatile memory, comprising:
    loading, from the nonvolatile memory into a cache memory, a fragment of each of a plurality of layers of an address mapping corresponding to a target logical address to be accessed and a fragment of a data mapping corresponding to the target logical address, each bit of the data mapping indicating whether or not data stored at a physical address of the nonvolatile memory is valid, the layers being arranged in a hierarchy, each layer of the address mapping except for the lowermost layer indicating correspondence between each of segmented logical address ranges mapped in the layer and a physical location of an immediately-lower layer in which said each of segmented logical address ranges is further mapped in a narrower range, the lowermost layer indicating correspondence between each logical address mapped in the lowermost layer and a physical location of the nonvolatile memory associated with said each logical address mapped in the lowermost layer, and the loaded fragment of the data mapping having the same size as each of the loaded fragments of the layers of the address mapping; and
    accessing the nonvolatile memory at a physical address mapped from the target logical address, referring to the fragments of the layers of the address mapping loaded into the cache memory.

2. The method according to claim 1, further comprising:
    updating the loaded fragments of the layers of the address mapping upon writing data associated with the target logical address into the physical address mapped from the target logical address; and
    overwriting the address mapping stored in the nonvolatile memory with the updated fragments.

3. The method according to claim 2, further comprising: erasing the updated fragments from the cache memory when a capacity of the cache memory decreases to a threshold level.

4. The method according to claim 1, further comprising:
    maintaining the loaded fragments in the cache memory after reading data associated with the target logical address from the physical address mapped from the target logical address; and
    erasing the loaded fragments from the cache memory when a capacity of the cache memory decreases to a threshold level.

5. The method according to claim 1, wherein said each layer of the address mapping includes a plurality of fragments, each of which corresponds to a different logical address range, and fragments in different layers of the address mapping have a same size.

6. The method according to claim 5, wherein each fragment of an uppermost layer of the address mapping corresponds to a different one of a plurality of namespaces that is established for address mapping of the nonvolatile memory.

7. The method according to claim 6, wherein
    the namespaces include a first namespace and a second namespace that has a different length of an address range than the first namespace, and
    a number of layers of the address mapping corresponding to the first namespace is different from a number of layers of the address mapping corresponding to the second namespace.

8. The method according to claim 1, further comprising:
    attaching, to each of the loaded fragments, a first pointer to indicate a position in the cache memory at which a fragment of an immediately-upper layer, if any, is loaded and a second pointer to indicate a position in the cache memory at which a fragment of an immediately-lower layer, if any, is loaded.

9. The method according to claim 1, further comprising:
    updating the loaded fragments of the layers of the address mapping and the loaded fragment of the data mapping upon writing data associated with the target logical address into the physical address mapped from the target logical address; and
    collectively overwriting the address mapping and the data mapping stored in the nonvolatile memory with the updated fragments of the address mapping and the updated fragment of the data mapping, respectively.

* * * * *